United States Patent

Sakamoto et al.

[11] Patent Number: 5,319,403
[45] Date of Patent: Jun. 7, 1994

[54] CAMERA CAPABLE OF PROVIDING PRINTING INFORMATION

[75] Inventors: Hiroshi Sakamoto, Kawasaki; Kazuyuki Kazami, Tokyo; Daiki Tsukahara, Kawasaki; Masaru Muramatsu, Yokohama, all of Japan

[73] Assignee: Nikon Corporation, Tokyo, Japan

[21] Appl. No.: 107,041

[22] Filed: Aug. 17, 1993

Related U.S. Application Data

[63] Continuation of Ser. No. 831,664, Feb. 6, 1992, abandoned, which is a continuation of Ser. No. 698,180, May 6, 1991, abandoned, which is a continuation of Ser. No. 393,964, Aug. 15, 1989, abandoned.

[30] Foreign Application Priority Data

Aug. 19, 1988 [JP] Japan .................. 63-205769
Aug. 30, 1988 [JP] Japan .................. 63-217455

[51] Int. Cl.⁵ .............. G03B 5/00; G03B 13/12; G03B 17/24
[52] U.S. Cl. ................. 354/106; 354/195.1; 354/195.13; 354/199; 354/222; 354/159
[58] Field of Search .............. 354/105, 106, 109, 159, 354/199, 195.13, 195.12, 195.1, 222

[56] References Cited

U.S. PATENT DOCUMENTS 4,774,536 9/1988 Inoue et al. .................. 354/106
4,982,213 1/1991 Kazami et al. ............... 354/195.12

Primary Examiner—W. B. Perkey
Attorney, Agent, or Firm—Shapiro and Shapiro

[57] ABSTRACT

A camera provides information to a printer to produce a print in which an image of a photographed object is of a desired size. More particularly, the enlargement magnification of a printer is controlled in accordance with information recorded on a recording medium in a camera. Determination of the enlargement magnification involves various parameters including, for example, a specified desired magnification (requested magnification) and photographing magnification, which may be determined by calculation from object distance and focal length of the photographing lens. Modification data may be produced to accommodate changes in photographing angle that accompany focusing of the photographing lens. Focal length or object distance may be varied as required to provide a print image size as close as possible to that desired (and within limitations of the camera).

34 Claims, 18 Drawing Sheets

CORRECTION SUBROUTINE

CORRECTION SUBROUTINE

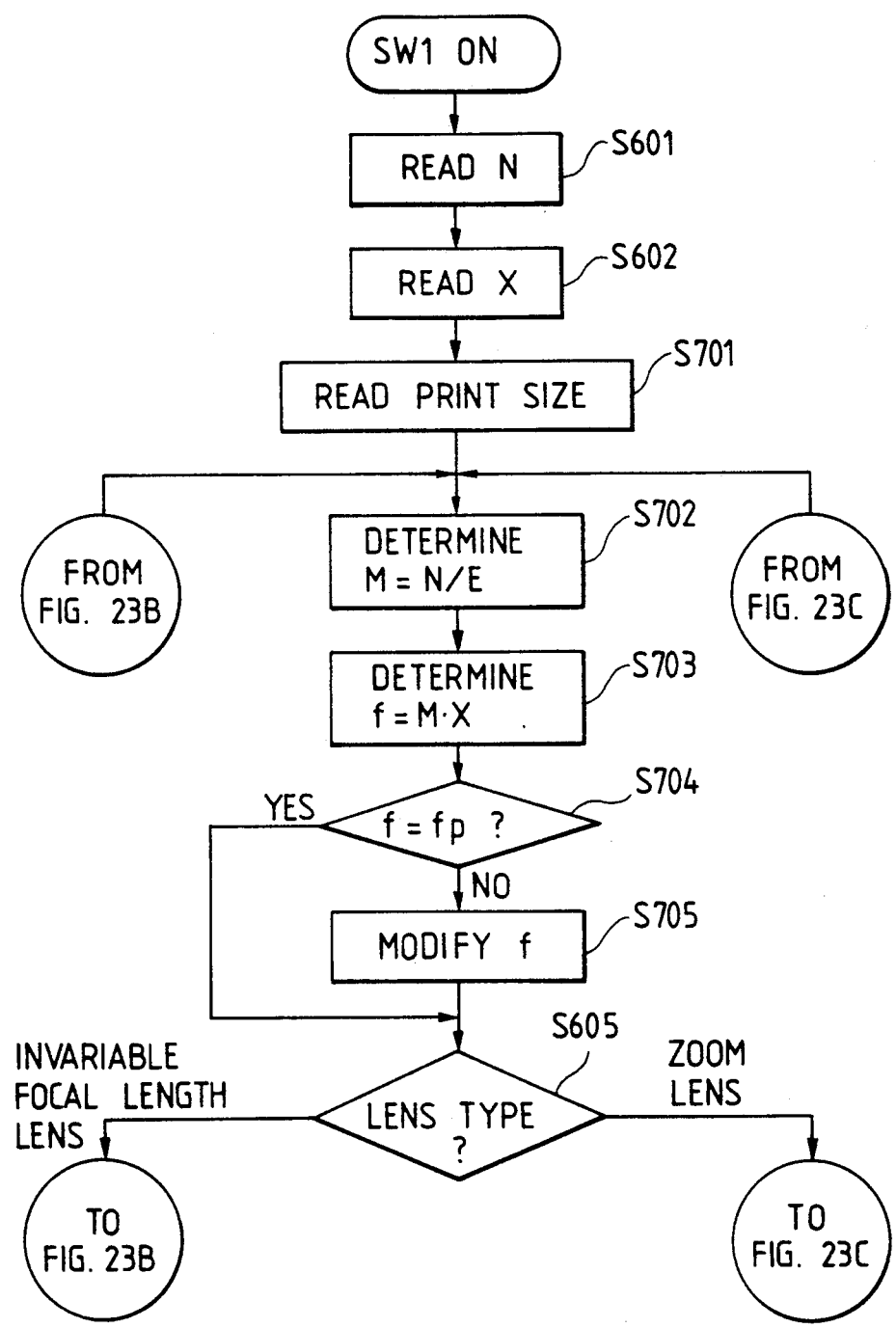

CAMERA CAPABLE OF PROVIDING PRINTING INFORMATION

This is a continuation of application Ser. No. 831,664 filed Feb. 6, 1992, which is a continuation of application Ser. No. 698,180 filed May 6, 1991, which is a continuation of application Ser. No. 393,964 filed Aug. 15, 1989, all now abandoned.

BACKGROUND OF THE INVENTION

1. Field of the Invention

This invention relates to a camera capable of providing printing information such as enlarging information for producing a print and, more particularly, to a camera, which permits specification of a finish state of print such as image size at the time of photography.

2. Related Background Art

When taking photographic pictures, there are cases when it is desired to obtain the object image on a print in the same size as or one-half the size of the actual object, that is, it is desired to obtain the object image on a print in a desired magnification with respect to the actual object. In such a case, it is necessary for the photographer to undertake the following.

First, the photographing magnification is determined by calculation from the distance to the object and focal distance of the photographing lens at the time of photography. Then, the magnification of printing enlargement is determined by calculation from the photographing magnification thus determined and a desired magnification (or requested magnification), in which the object image is to be printed. The enlargement magnification thus determined is specified at the time of printing to obtain a print (i.e., photograph) of the object in a desired size.

The above procedure, however, requires time-consuming calculations. In addition, it can be done only by users having highly advanced knowledge of photography and can not be readily done by anybody.

In another aspect, usually an object image is printed on a printing sheet of a selected size, and the frame image on film is enlarged to a standard size of print provided in a print service shop or the like. In addition, there is a case of adjusting the print size by trimming at the time of printing.

When a photographic image is printed on a printing sheet, it is usually enlarged to have a certain size. Usually, one frame image on film is enlarged such as to comply with a standard size of printing sheet so that no care is needed for the absolute size of the image. However, depending on the purpose of a photographic print there is sometimes a case when a print is finished with a desired absolute size of image. For example, in a certificate photograph an image of an upper half of the object has to adequately occupy the print area of a given size. Therefore, an adequate size of the upper half object image is naturally determined for a given print size.

Conventionally, however, unless a particular specification is given only enlargement of the entire image to a certain standard size is effected without particular consideration given to the size of a particular portion of an image on film. When it is desired to specify a distance between two points of an image, i.e., an image size, it is necessary to produce a trial print and request printing to the printer by observing the trial print. In addition, in printing a cumbersome operation is required to produce a finished print in a specified image size. For example, when a general enlarger is employed, it is necessary to adjust focus of an enlarging lens and confirm an obtained image every time the image size is changed. In addition, it is difficult to measure the image size for the image is moved on an easel. Further, when a request of printing under the same conditions as those of a previous request is received again, the same procedure has to be repeated manually.

For the above reason, the print cost is increased to an extent depending on the extra manual process, and although merits of specifying the image size are recognized, it has not been a usual practice to request printing by specifying the image size.

SUMMARY OF THE INVENTION

An object of the invention is to provide a camera, which permits specification of a given distance between two points in the field of the image corresponding to a desired size on a print at the time of photography.

Another object of the invention is to provide a camera capable of providing, by merely inputting requested magnification data, printing information permitting a print of an object image enlarged to a desired magnification to be obtained.

To attain the above objects, in a camera capable of providing printing information according to the invention, area specification means is provided for defining a specific area in the viewfinder field of view, i.e., for defining an object image, also size specification means is provided for determining the size of the specific area on a print, and an enlargement magnification is obtained from the size of the specific area on the print and the size of the print. In a different mode of the invention, means for providing object distance data and means for providing focal distance data are provided to supply data of the distance to the object and data of the focal distance of the photographing lens and determine the photographing magnification from the two distance data, while requested magnification specification means is provided for specifying a requested magnification, in which photography data on film is visualized, and the enlargement magnification is determined by calculation from the requested magnification and photographing magnification. The determined enlargement magnification is recorded on a recording medium or displayed on a display.

Thus, with a camera with size specification means it is possible for film obtained after photography to be processed in a printing system in a print service shop or the like according to the enlargement magnification data to produce a photograph of a specified size. Also, with a camera capable of determination of the enlargement magnification by calculation from the requested magnification and photographing magnification, the object image can be readily visualized in a photographer's desired magnification in the printing system.

The above and other objects, features and advantages of the invention will become more apparent from the following detailed description with reference to the accompanying drawings.

BRIEF DESCRIPTION OF THE DRAWINGS

FIGS. 22A to 22D and 23A to 23D are flow charts illustrating camera routines in fourth and fifth embodiments of the invention.

DESCRIPTION OF THE PREFERRED EMBODIMENTS

Preferred embodiments of the invention will now be described with reference to the accompanying drawings.

Figure 1:
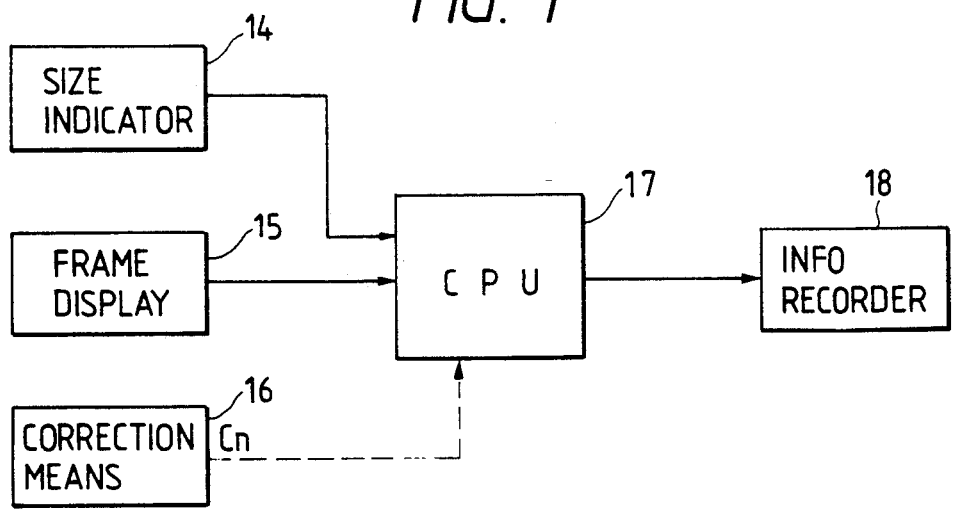
FIG. 1 is a block diagram showing the basic construction of a first embodiment of the invention.

FIG. 1 shows the basic construction of a first embodiment of the invention. A size indicator 14 is for specifying a photographer's desired distance between two points on a photographic print by operating an operable member while observing a display. The specification may be effected by providing a numerical value input or by selecting a preliminarily prepared numerical value menu. A frame display 15 displays in a viewfinder field of view a frame based on the specification by the size indicator 14. It displays the size and directions (vertical and horizontal) of a frame corresponding to distance specified by the photographer. It also supplies to a CPU 17 data representing the indicated size relative to the viewfinder. When the desired size is specified, the photographer performs photographing by adjusting the positional relation between the frame in the viewfinder field of view and foreground subject.

The focusing to the subject produces a slight change in the angle of view even if a constant focal distance is maintained. This phenomenon is particularly pronounced in close distance photography. With a camera with automatic lens focusing a difference is produced between the angle of view at the time of focusing and viewfinder field of view (i.e., angle of view) prior to focusing. Correction means 16 provides correction data Cn representing the difference noted above. Correction data are provided for corresponding photographing distance data. The CPU determines a printing magnification from size data representing the distance between two points noted above, frame size data with respect to the viewfinder field of view and correction data with respect to measured distance data. An information recorder 18 records the magnification data on a film or like recording medium. For example, it records data optically on a film or electrically on an $E_2PROM$ provided in a film cartridge or the like. When a film obtained by the photographing is handed over to a printer, a printing system thereof produces a photographic print of the specified size according to the magnification recorded on film or film cartridge. The recorded information concerning the magnification need not be the magnification data itself, but it may be a coefficient of a predetermined printer's standard magnification, distance between two points, frame size with respect to the viewfinder field of view or correction with respect to distance measurement data. Even with the data other than the magnification data itself a print of the specified size can be readily obtained with a suitable process provided in the printing system.

The embodiment will now be described in greater detail.

Figure 2:
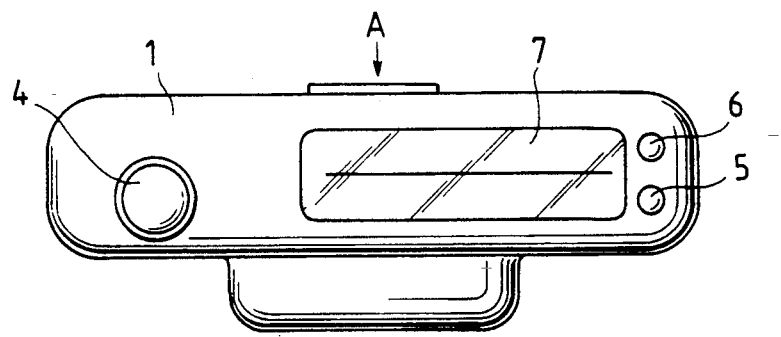
FIG. 2 is a top view showing a camera in the first embodiment of the invention.
Figure 3:
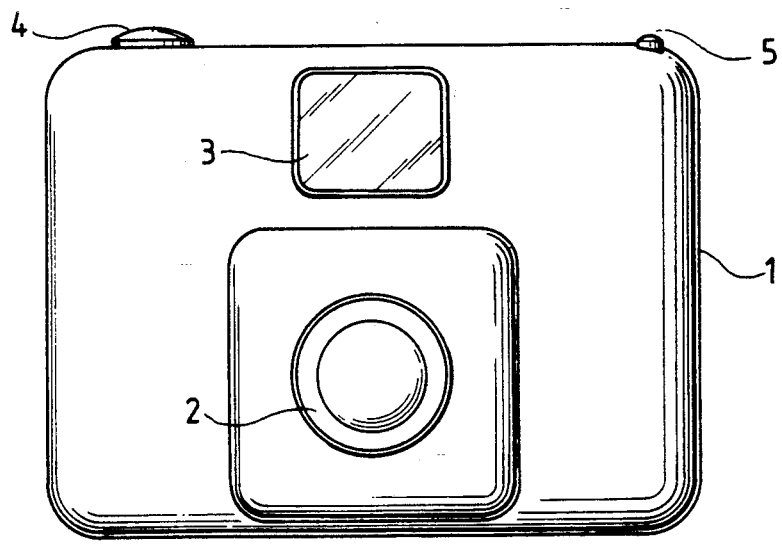
FIG. 3 is a front view showing the camera in the first embodiment of the invention.

A camera 1 shown in FIGS. 2 and 3 is an autofocus camera with a photographing lens 2 having a single focal distance. The photographing lens 2 is suitably sufficiently compensated for various aberrations, particularly distortion. This is so because the absolute size of image is important in view of the utilization of the photographic print which is intended by the instant system. Desirably, therefore, a satisfactory image size relation is maintained not only between the specified two points but also between two general points. A viewfinder 3 is disposed at a position close to the axis of the photographing lens 2 to minimize parallax. A release button 4 is provided atop the camera 1 along with a mode button 5, an input button 6 and a liquid crystal panel 7 as will be described later in detail.

Figure 4:
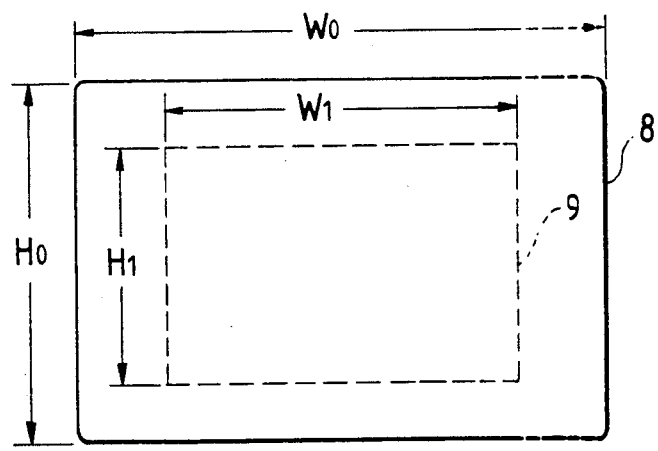
FIG. 4 is a plan view showing a viewfinder field of view of the first embodiment of camera shown in FIG. 3.

FIG. 4 shows the viewfinder field of view. A field frame 8 and a frame 9 specified by the photographer are shown. In this embodiment, the frame 9 is assumed to be a fixed frame which is vertically and horizontally symmetrical with respect to the center of view. On the film, the long and short sides of the field frame 8 respectively correspond to the width W0 and height H0. If the field factor of the viewfinder 3 is 100%, W0 by H0 is the size of one frame of film in this system. The frame 9 likewise corresponds to a size of W1 by H1 on the film.

Figure 5:
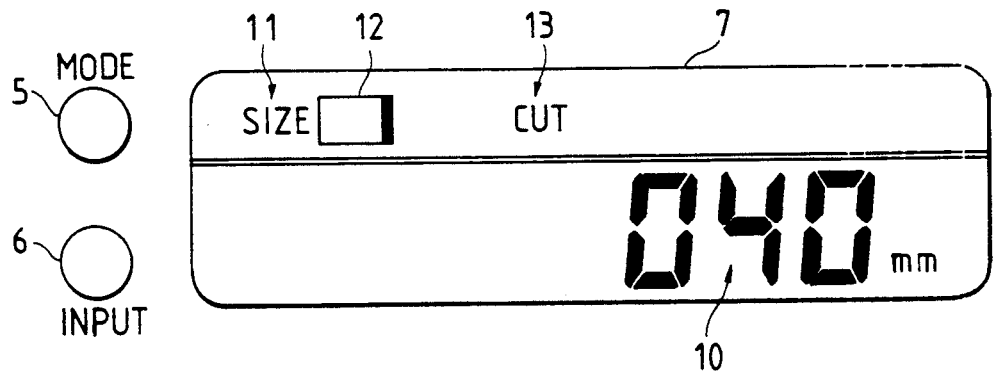
FIG. 5 is an enlarged-scale plan view showing a liquid crystal display and nearby parts of the first embodiment of camera shown in FIG. 2.

FIG. 5 shows the liquid crystal panel 7 to an enlarged scale. The liquid crystal panel 7 provides on its surface a numerical value 10 displayed by operating the input button 6, a display 11 of a size specification mode, a standard display 12 specifying the size of the frame 9 and a display 13 designating the cutting of print edge.

Figure 6:
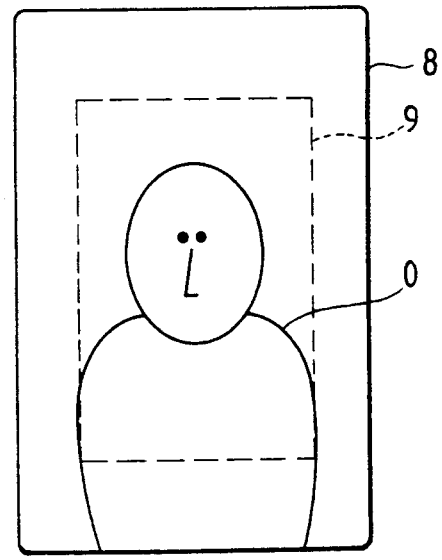
FIG. 6 is a view for explaining the size of an object image in the viewfinder field of view at the time of photography.

Now, an operation of taking a certificate picture (50 mm vertical by 40 mm horizontal) as shown in FIG. 6 will be described sequentially. Since a desired certificate picture is usually vertically elongate, the camera 1 performs photography with respect to a vertical position. Therefore, a portion of the viewfinder field of view corresponding to the short side H1 of the frame 9 is to be finished to 40 mm on a print. In a flow chart shown in FIG. 7, the size specification mode is set by depressing the mode button 5 in step S101. At the same time, a choice is made as to whether the long or short side (W1 or H1) of the frame 9 is a reference of size indication. When the size indication mode is set, the size indication mode display 11 and display 12 of the short side H1 of the frame 9 as reference are displayed on the liquid crystal panel 7. The long side W1 of the frame 9 may be set as a reference by depressing the mode button 5 once again.

In step S102 frame size data is input in terms of a numerical value by operating the input button 6. Since in the instant case the short side H1 of the frame 9 is the reference of indication of the selected size, the size of the short side H1 is specified. For example, the displayed numerical value 10 can be increased from 20 mm to 199 mm and then from 20 mm again by operating the input button 6. The numerical value of the display when the input button 6 is released is set as the specified size.

In step S103 the photographer executes auto-focus photography by operating the release button after adjustingly matching the horizontal size of the foreground object 0 and the short side of the frame 9 by adjusting the photographing distance. Then, step S104 is executed. This step S104 is most important in this camera system. When the short side of the specified frame 9 on film is H1, denoting the specified size by S (40 mm), the printing magnification E is $$E = S/H1 \quad (1)$$

Further, when photography with the camera in the horizontal position is selected, W1 is substituted in lieu of H1 into the equation (1). After determination of the magnification, the CPU 17 executes step S105 of correction according to correction data from the correction means 16. To obtain the correction data, the correction means 16 may determine a change in the angle of view from distance measurement data. Alternatively, it is possible to determine the change in the angle of view in relation to the extent of feed of the lens. In either case, the CPU 17 has a data base for the change in the angle of view of the photographing lens 2.

In subsequent step S106 the magnification E is recorded on a film or the like to be ready for transfer to the printer.

The basic operation concerning the first embodiment of the invention has been described above. Now, the operation of the first embodiment will be described in greater detail in an aspect of convenient and deficiency-free handling.

A photographic print can be produced in specifiable size according to the invention by a processing system including a printer. It is therefore recommended to control the camera at the time of photography by taking restrictions of the printer and so forth into considerations in advance.

For example, in case of a printer with variable magnification from 2 to 8 times, it is possible to specify 2 to 8 times the size H1 or W1 of the frame 9 on film. An example of the size specification subroutine will now be described.

Figure 7:
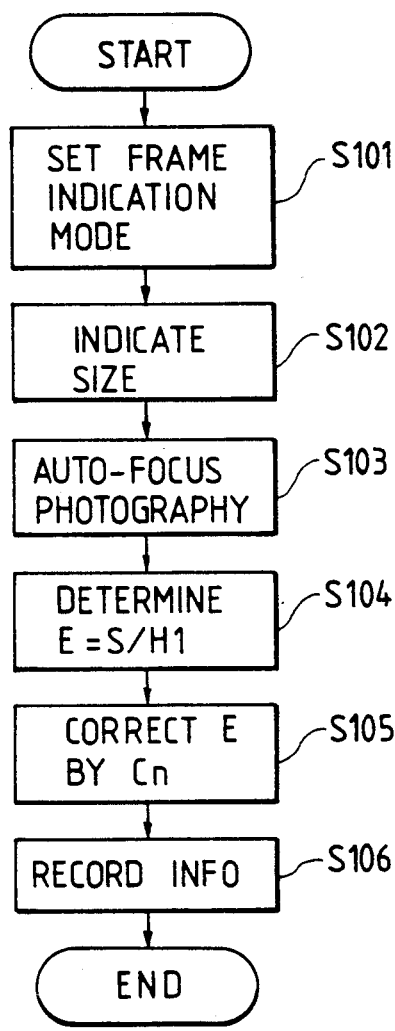
FIG. 7 is a flow chart illustrating a routine executed in the first embodiment of the invention
Figure 8:
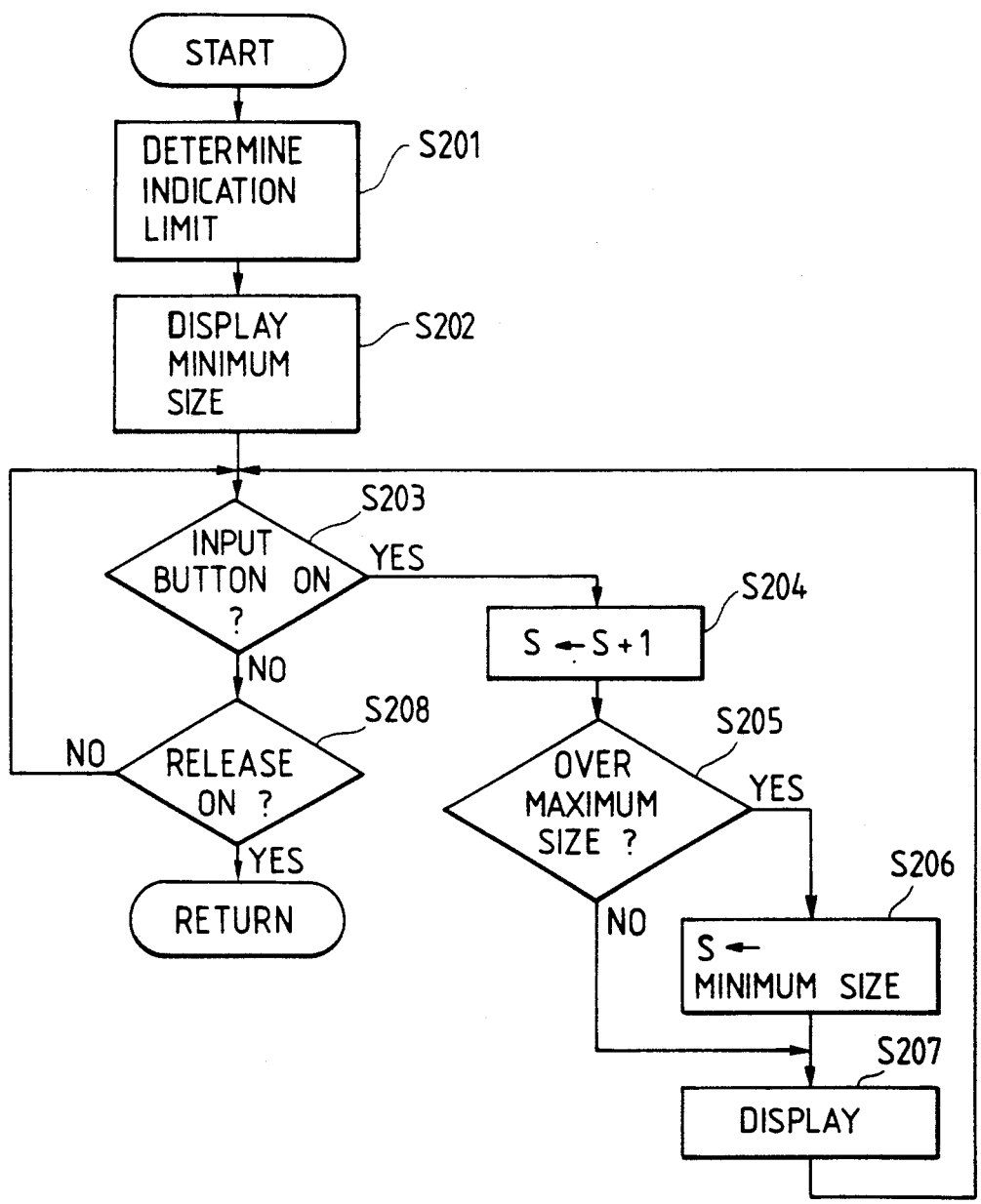
FIG. 8 is a flow chart illustrating a size indication step shown in FIG. 7.

Subsequent to step S101 in FIG. 7, step S201 in FIG. 8 is executed, in which the lower and upper limits of size indication are determined respectively to 2 and 8 times H1 or W1. Actually, a range narrower than 2 to 8 times may be set from considerations of the subsequent correction. Then, as the initial value of size indication the lower limit of range is set and displayed as numerical value display 10 on the liquid crystal panel 7 (step S202). The indicated size S displayed as numerical value display 10 is then incremented by one every time the input button 6 is depressed once, and a check is done as to whether the displayed figure is above the upper limit determined in the step S201 (steps S203 to S205). If step S205 provides YES, the indicated size S is brought back to the initial lower limit value (step S205), and this initial value is displayed on the liquid crystal panel 7 (step S207). If step S205 provides NO, the indicated size S being incremented in step S204 is displayed.

More specifically, while the input button 6 is operated, the indicated size S is progressively increased up to the upper limit and then returned to the initial lower limit to increase again. When the input button 6 is no longer operated, step S208 is executed. When the release button is operated, a decision of an end of the size specification subroutine, and the displayed value is held, and the routine returns to the main routine.

In the above subroutine, the value of the indicated size S may be increased one by one or at intervals like a geometric series.

Figure 9:
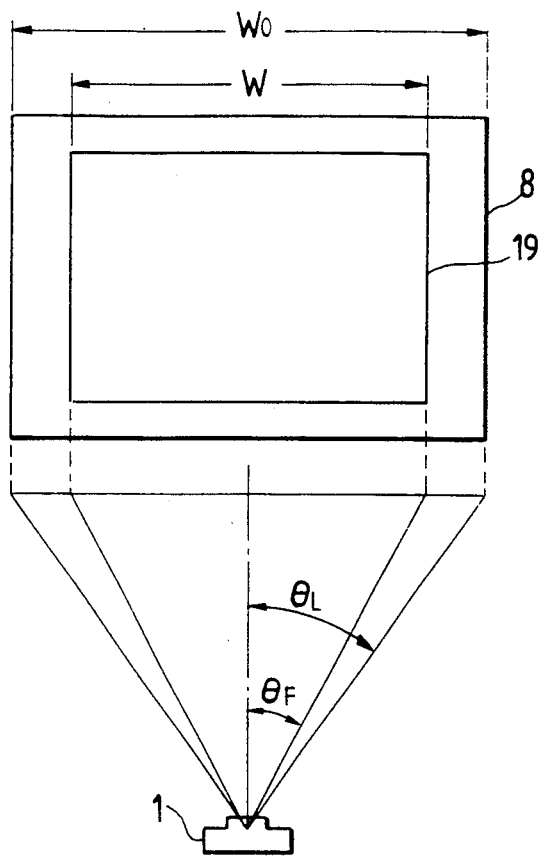
FIG. 9 is a view for explaining a range of size indication by a zoom lens viewfinder.
Figure 10:
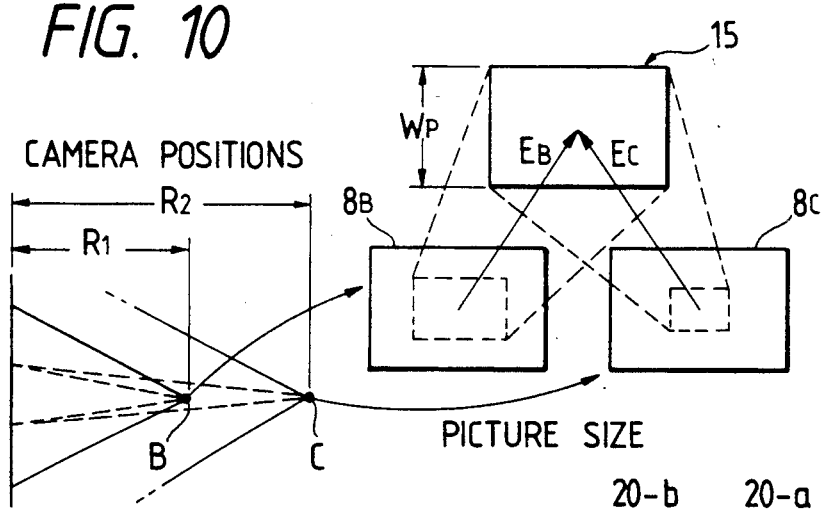
FIG. 10 is a view for explaining a relation between photographing distance and enlargement magnification.

Further, the frame in the viewfinder need not be a sized frame, and it is possible to permit selection of a desired distance. As a further alternative, a zooming viewfinder optical system may be adopted to permit size indication in a range observable through the viewfinder at all times. In the previous case of fixed frame the positional relation between the foreground object and frame is controlled by controlling the photographing distance. However, matching the size of a distant foreground subject (essentially background) the frame can not be effected by merely slightly varying the photographing distance. Therefore, the viewfinder field of view of frame is desirably variable.

Where the viewfinder optical system or frame is variable, the distance between two points on film for size specification is of course also variable. FIG. 9 shows an example of horizontal size specification in the viewfinder field of view with zooming of a viewfinder optical system.

In FIG. 9, the horizontal dimension of one frame 8 of film is W0, and one half of the corresponding horizontal angle of view of the photographing lens is shown as $\theta_L$. The viewfinder field 19 of view is capable of zooming in a range smaller than the horizontal angle $\theta_L$ of view of one frame of film, and one-half of its horizontal angle of view is shown as $\theta_F$. On the film, the size corresponding to the horizontal size of the viewfinder field 19 of view is W. Since the half horizontal angle $\theta_F$ of view of one film frame is constant with respect to infinite distance, only the half horizontal angle of view of the viewfinder field of view is changed with zooming of the viewfinder caused by the photographer. Geometrically, W is $$W = W0 \times \tan\theta_F \tan\theta_L \quad (2)$$

Thus, if an encoder is provided, which can provide a value corresponding to the field angle of view of the viewfinder with zooming thereof, a size specification scale can be provided. Again in this case, upper and lower limits of indicated size are determined to prevent a size specification incapable of being coped with to be delivered to the printer.

Where a variable size specification scale is provided in a viewfinder or the like, however, there are two considerations in control. That is, (i) Selection of a plurality of photographing distances for obtaining prints of the same size, and (ii) Outer size of the print.

Now, the former consideration (i) of the selection of photographing distance will be discussed. Since the magnification is variable in a certain range, there are a plurality of combinations of photographing distance (R1 or R2) and magnification for obtaining the same specified size Wp of print 15. The intended size Wp may be obtained by giving the printer information of comparatively small magnification E for a film frame 8B for photography from position B and information of a greater magnification than E for a film frame 8C photography from position C.

In this case, the smaller photographing distance permits obtaining the better print resolution and graininess for the magnification can be made smaller. Sometimes, however, the greater photographing distance is more suitable for a better perspective from the greater distance can be obtained for raised and depressed portions of the foreground object. Thus, it is effective to select a combination of the photographing distance and magnification depending upon the purpose of photography. Accordingly, a routine of advice to the photographer of control depending on the purpose of photography is executed as shown in FIG. 11.

Figure 11:
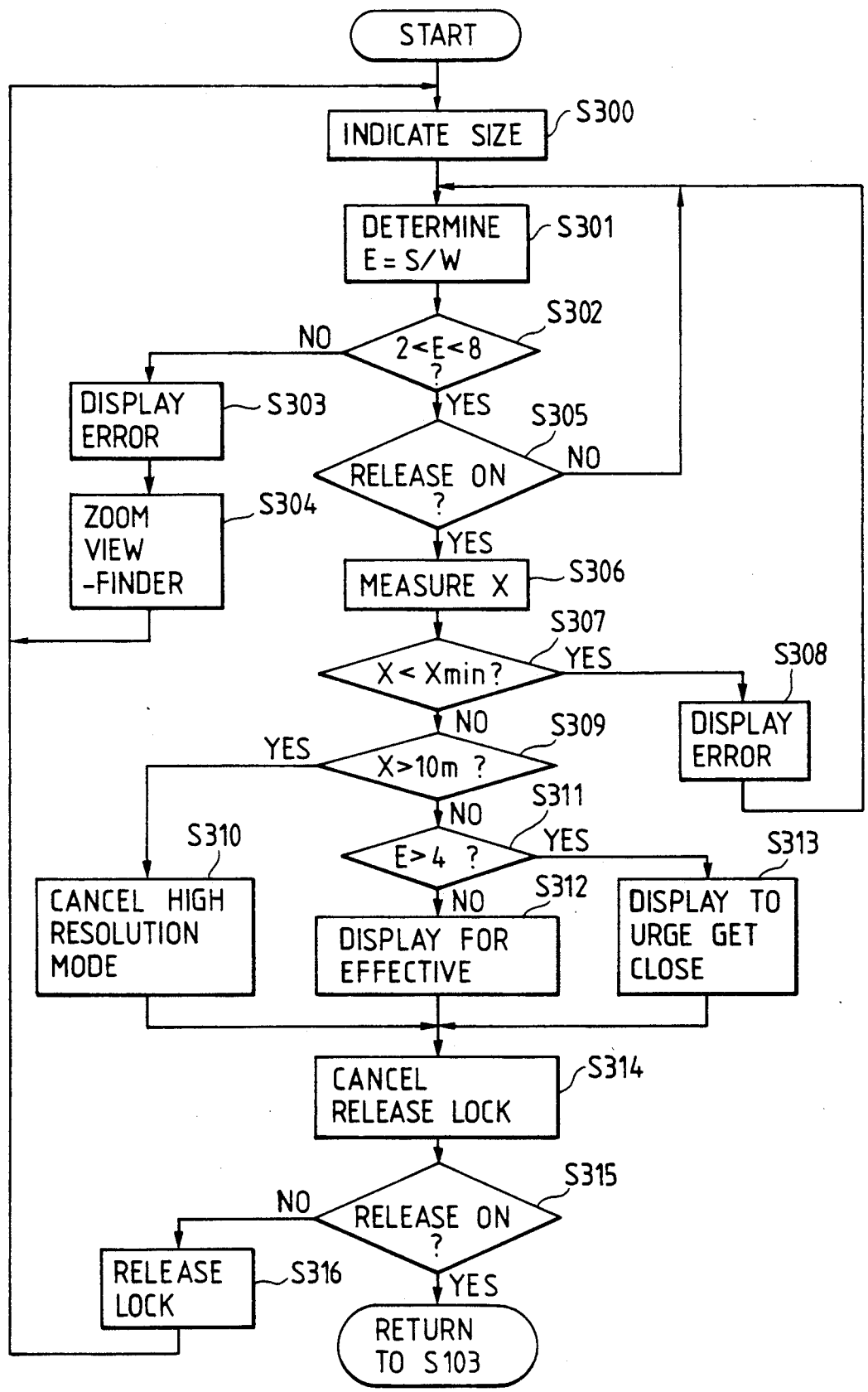
FIG. 11 is a flow chart illustrating a routine of control, in which an advice may be given for setting an optimum photographing distance with respect to the enlargement magnification.

Referring to FIG. 11, after numerically indicating the size (step S300) the magnification E is determined using equation (1) by determining the horizontal dimension W of the viewfinder field on film using equation (2) from the viewfinder frame 19 (with angle $\theta_F$ of view) shown in FIG. 9 (step S301). Then in step S302 a check is done as to whether the magnification E is in the printer interlock range (2 to 8 times). If this step provides NO, an error display is produced on the liquid crystal panel 7 at a predetermined position thereof (step S303), then the viewfinder is zoomed up to a magnification which does not produce any error display (step S304), and then the routine returns to step S300. The size indication is done in this repeated manner so that the magnification E is found in step S302 to be in the printer interlock range (2 to 8). Then in step S305 a check is done as to whether the release bottom 4 is "on". When it is found that the release bottom is "on", the distance X of the object is measured (step S306). Then a check is done in step S307 as to whether the distance X is less than the camera's minimum photographing distance Xmin. If so, an error display is given on the liquid crystal panel 7 at a predetermined position thereof (step S308), and the routine returns to step S301. Otherwise, i.e., if the distance is greater than the minimum photographing distance Xmin, a check is done as to whether the distance is a great distance (step S309). When the distance X of the object is greater than 10 m, for instance, the photographer has to be moved a great distance for focusing when an advice is provided for reducing the photographing distance in a high resolution mode to be described later. Since performing this instantly is difficult, the advice is not given. Instead, a high resolution mode is canceled (step S310), and only a release lock effected in the previous subroutine is canceled (step S314), thus suspending the high resolution mode control for a while.

When it is found in step S309 that the measured distance is not a great distance, a check is done in step S311 as to whether the standard magnification, for instance E, is above 4. If the magnification is no greater than 4, it is decided that a sufficiently high resolution can be obtained, and a display indicative of the effectiveness of specification is provided in a predetermined position of the viewfinder field of view (step S312). If it is found that the distance is comparatively small but nevertheless E is still above 4 and can be reduced, an advice for coming closer to the object is displayed at a predetermined position in the viewfinder field of view. Further, the release lock is canceled, thus leaving the magnification control to the photographer's will.

Subsequently, a check is done as to whether the release button is "on" (step S315). If the release button is not "on" yet, it is determined that the photographer has not decided to turn on the release button yet. Thus, the release lock is effected (step S316), and the routine returns to step S300 to permit control afresh. When it is found in the release button check step S315 executed once again that the release button 4 is "on" this time, the routine can go to the subsequent release sequence and thus goes back to step S103 of auto-focus photography in FIG. 7.

The above operation is executed when the selection of mode with an aim of obtaining satisfactory resolution and grainness by reducing the magnification is effected at the time of setting the size specification mode. In a routine with an aim of obtaining a perspective from great distance, an advice for providing a greater photographing distance is provided for increasing the magnification E in a similar routine.

Now, the consideration (ii) of outer shape of print will be discussed.

In the description so far, the outer size of print is not particularly mentioned. An area corresponding at least to a specified size should be printed. However, if it is possible to make a choice as to whether an edge portion around the specified size area as well, i.e., the entire frame of film, should be printed, cost reduction of print can be obtained, or it is possible to finish the specified size area as specified while enlarging the entire frame. The latter case permits a simple photographic synthesis process of finishing a portion of a print without trimming under size specification and applying a separate size-specified print to that portion. To this end, a choice as to whether an edge portion of print is to be cut away may be made when setting the size specification mode, and that choice data may be transmitted to the printer. In the case of the certificate photograph as shown in FIG. 6, an edge portion may be cut away, and therefore the choice of cut may be set and be displayed as symbol 13 as shown in FIG. 5 for confirmation.

Figure 12:
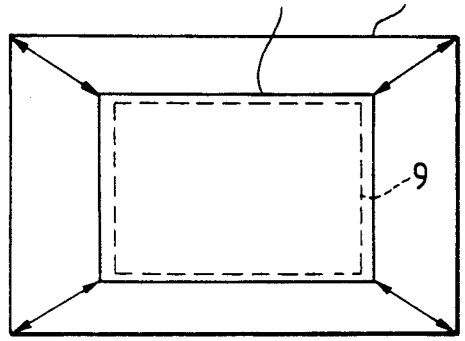
FIG. 12 is a view for explaining a relation between a variable magnification viewfinder and a fixed frame.

A viewfinder to this end is suitably one which can ensure a field of view corresponding to the whole frame of film and permits size specification with a variable frame in the ensured field. FIG. 12 shows a suitable viewfinder optical system. As is shown, while it has a fixed frame 9 in its field of view, it permits variable magnification of the whole film frame for selecting a large or a small magnification state 20-a or 20-b.

Further, as secondary control, when cutting away a portion other than a specified size area or when printing on a standard size printing sheet covering that area, the directivity of light-receiving means for exposure control may be controlled to about an area which is actually subject to printing.

A print of an intended size can be obtained through processing of a film after photographing with the above arrangements according to information transmitted to the printer.

As has been shown, with the above embodiment it is possible to obtain a photographer's desired print size.

Further, even where there is no intention of obtaining an image of object with any particular size on a print, with a particular size specification provided at all time, it is possible to obtain a print of a fixed size by requesting the printing to any printer so long as the printer adopts the system according to the invention.

The above first embodiment of the invention concerns a camera which permits a desired distance between two points in the field of view to be specified and recorded on a recording medium at the time of photography so that a desired print size can be obtained. Alternatively, it is possible to permit a magnification of the printer's enlargement to be specified from the camera's photographing magnification and recorded on a recording medium at the time of photography so that a print image can be obtained in a desired size.

Figure 13:
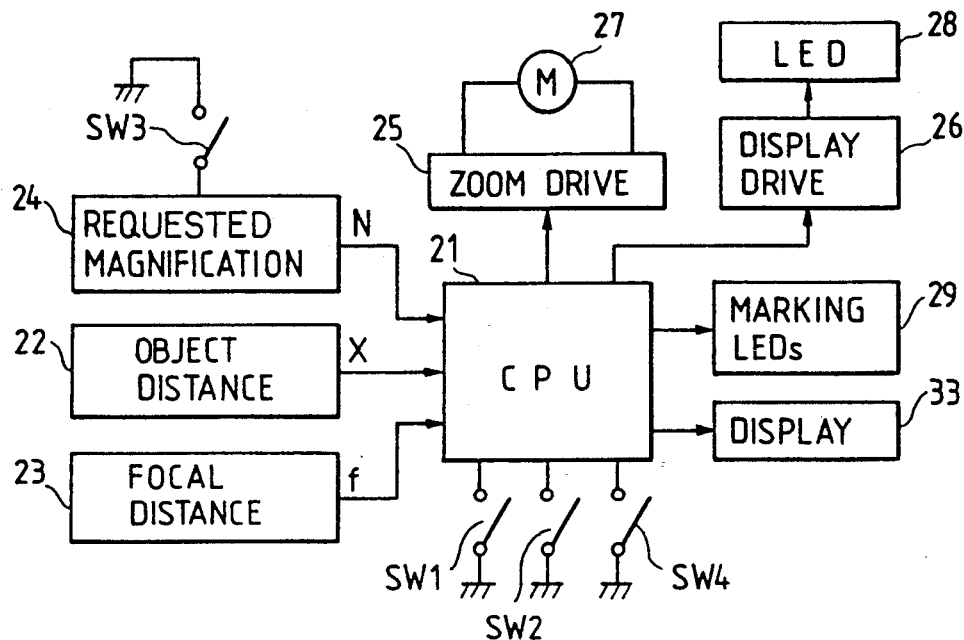
FIG. 13 is a block diagram showing the basic structure of a camera as a second embodiment of the invention.

FIG. 13 outlines an overall camera system in a second embodiment of the invention, which permits magnification of enlargement to be recorded on a recording medium at the time of photography.

Referring to FIG. 13, to a CPU 21 are connected an object distance measuring unit 22, a photographing lens focal distance data generator 23 and a requested magnification setter 24. The measuring unit 22 supplies detected data x of the distance to an object (i.e., object distance) to the CPU 21. The focal distance data generator 23 supplies focal distance data f of a photographing lens to the CPU 21. The camera of this second embodiment is capable of mounting a zoom lens. Focal distance data is provided by a zoom encoder or the like provided in the zoom lens, and it is supplied through the focal distance data generator 23 to the CPU 21.

To the requested magnification setter 24 is connected a manual switch SW3, which can be operated for specifying an object's magnification (i.e., requested magnification N), with which a negative film image is to be printed. The magnification here is the ratio of the print size of object to the actual size thereof.

In the requested magnification setter 24, a plurality of selectable requested magnification values, for instance 1, ½, ⅓, . . . are stored. When setting a magnification specification mode to be described later, one of the requested magnification values is set as requested magnification N by turning on the switch SW3 a corresponding number of times, and the requested magnification data is supplied to the CPU 21.

According to the supplied object distance data x and focal distance data f the CPU 1 determines the photographing magnification M, and also according to the photographing magnification M and requested magnification data N it determines the magnification E of enlargement at the time of printing.

To the CPU 21 are further connected a zoom driver 25, a display driver 26 as well as switches SW1, SW2 and SW4. The switch SW1 is turned on by depressing the release button. The switch SW2 is turned on by turning on the release button. The switch SW4 is operable for setting the magnification specification mode. The CPU 21 sets the magnification specification mode in response to the turning-on of the switch SW4.

The zoom driver 25 is connected to a zoom drive motor 27 to drive the photographing lens to a given focal distance position according to a zooming signal from the CPU 21. To the display drive 26 is connected a LED 28 in the viewfinder. The LED 28 is turned on in response to a display drive signal from the CPU 21. An external display 33 is further connected to the CPU 21. Further, a marking unit 29 having a plurality of marking LEDs (not shown) is connected to the CPU 21 for effecting marking in response to a marking signal from the CPU 21.

By the term "marking" is meant an operation of providing a mark representing the magnification of enlargement at the time of printing or the like on a marginal portion of each film frame by turning on corresponding LEDs. The mark represents one of preset magnifications in terms of corresponding number and positions of "on" LEDs. When setting the magnification specification mode noted above, the CPU causes shutter release in response to the turning-on of the switch SW2, which is a full depression switch, while also it provides a marking signal corresponding to a determined magnification E of enlargement.

Now, an enlarger for producing a print from a film after photography will be described with reference to FIG. 14.

Figure 14:
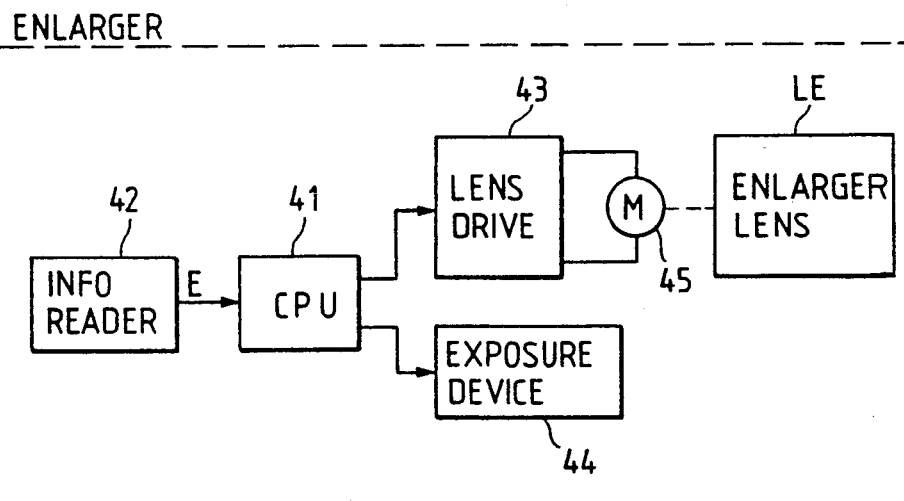
FIG. 14 is a block diagram showing an enlarger.

Referring to FIG. 14, the enlarger includes its own CPU 41. To the CPU 41 is connected an information reader 42, which reads data of magnification E marked for each frame of film and supplies the read data to the CPU 41.

A lens driver 43 and an exposure device 44 are also connected to the CPU 41. A motor 45 is connected to the lens driver 43. In response to an instruction from the CPU 41 the lens driver 43 causes an enlarging lens LE to be driven by the motor 45 to a given position. The exposure device 44 includes an illumination light source, a stop and a shutter. It effects exposure in response to an instruction from the CPU 41, thus effecting printing of each frame negative image of film on a printing sheet.

The CPU 41 recognizes a magnification E of enlargement according to a mark data input. Then, it provides a lens drive signal for driving the enlarging lens to a position corresponding to the recognized magnification E and subsequently provides an exposure drive signal.

Now, a control routine of the camera CPU 21 will be described with reference to the flow charts of FIGS. 15 and 16.

When setting the magnification specification mode noted above, a desired requested magnification N is specified by operating the switch SW3, and then the release button is depressed. As a result, the switch SW1 is turned on, whereupon the requested magnification setter 24 effects setting of the requested magnification N. At the same time, a routine shown in FIG. 15 is started. The requested magnification N is read in step S401, then the object distance x is read in step S402, and then the focal distance f of the photographing lens is read in step S403.

In subsequent step S404, the photographing magnification M is determined from the read-out object distance x and focal distance f as $$M = f/x \tag{3}$$

In subsequent step S405 the magnification E of printing enlargement is determined from the photographing magnification M and requested magnification N. Since the requested magnification N is the product ($E \times M$) of the photographing magnification M and printing enlargement magnification E, the magnification E is determined as $$E = N/M \tag{4}$$

In subsequent step S406 the determined printing enlargement magnification E and focal distance f are corrected. This correction permits marking of magnification E, and it is executed in a correction subroutine shown in FIG. 16. Referring to FIG. 16, a check is first done in step S461 as to whether the magnification E is a predetermined value. More specifically, the mark produced on film represents a predetermined magnification M of enlargement in terms of the number and marking positions of "on" LEDs. Therefore, it is impossible to provide an analog indication of the magnification E because of restriction on the number of marking LEDs. For this reason, predetermined values E' of enlargement magnification capable of being marked are preset as integral numbers, for instance 4, 8, 12, . . . , in the CPU 21, and a check is done as to whether any of the preset values E' is identical with the value E determined in step S405. Usually, a determined magnification E is not an integral number. In this case, therefore, none of the preset values E' is identical with E, and hence step S461 provides NO. In this case, the routine goes to step S462, and otherwise it goes to step S407 in FIG. 15.

In step S462 a display signal is produced to drive the LED 28 for announcing that the determined enlargement magnification E is not a predetermined value, and then the routine goes to step S463. In step S463, the magnification E is modified. More specifically, the closest one of the preset values E' of magnification as noted above to the determined magnification E is set as a new enlargement magnification E.

For example, in case when the focal distance f of the photographing lens is 35 mm, object distance x is 45 cm and requested magnification N is unity (i.e., N=1), from equation (3)

$$M = 35/450 \ 0.078$$

and also from equation (4)

$$E = 1/0.078 \ 12.8$$

None of the preset values of magnification is 12.8, and hence the closest preset value of 12 is set as the new enlargement magnification.

Subsequently, the CPU 21 executes a routine of changing the focal distance f of the photographing lens to one corresponding to the modified enlargement magnification E. In the first place, the photographing magnification M given in equation (4) is obtained in step S464 form the enlargement magnification E obtained in step S463. In the above example, E=12 and N=1, and hence M=1/12. In subsequent step S465 a new focal distance f is determined by substituting the object distance x obtained in step S465 and photographing magnification M obtained in step S464 into equation (3). In the above example M=1/12 and x=450 mm, and hence f=1/12×450 mm=37.5 mm. This means that the focal distance f is changed form 35 mm to 37.5 mm. In subsequent step S466 the photographing lens is moved to a position corresponding to the new focal distance by the motor 27 driven by a zooming signal supplied to the zoom driver 25. The routine then goes to step S407 in FIG. 15.

In step S407 a check is done as to whether the full depression type switch SW2 is "on". If this step provides NO, a check is done in step S410 as to whether the switch SW1 is "on". If this step S410 provides YES, the routine returns to step S407, while otherwise an end is brought to the routine.

If step S407 provides YES, step S408 is executed, in which an exposure control member such as a variable stop or a shutter (not shown) is driven for photography. In subsequent step S409 a marking signal is supplied to the marking unit 29 to turn on predetermined marking LEDs. In this way, data representing the magnification E obtained in step S463 is set on a marginal portion of film by marking, thus bringing an end to the routine.

Figure 17:
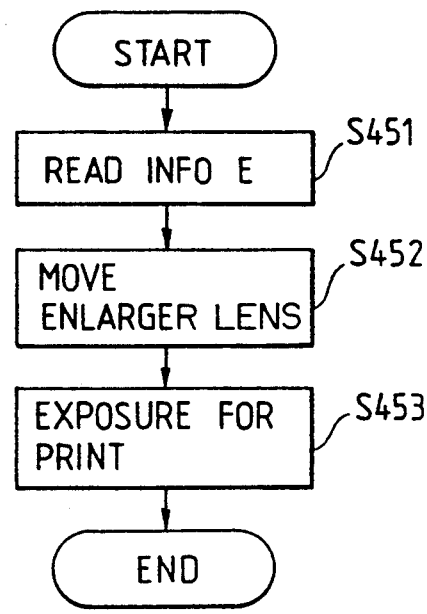
FIG. 17 is a flow chart illustrating an enlarger routine.

The film after the photography and marking performed in the above routine is supplied to the enlarger for printing in a routine shown in FIG. 17. The routine in FIG. 17 is for printing of only one frame of film.

Referring to FIG. 17, in step S451 the CPU 41 in the enlarger reads out data of the enlargement magnification E marked on film, and in step S452 it provides a lens drive signal to move the enlarging lens LE to a position corresponding to the read-out enlargement magnification E. In subsequent step S453 the exposure devices 44 executes exposure for printing.

As has been shown, the camera routine is executed to determine the photographing magnification M from the object distance x at the time of photography and focal distance f of the photographing lens and the enlargement magnification E at the time of photography from the photographing magnification M and requested magnification N. If the enlargement magnification E is none of the predetermined values noted above, it is modified to the closest one of the predetermined values, while the focal distance f of the photographing lens is corrected as needed with the requested magnification N when the modified value is adopted. Thereafter, the modified enlargement magnification E is marked on film concurrently with photography.

Further, the enlarger routine is executed to read out the enlargement magnification E marked on film, then move the enlarging lens according to the read-out data and then effect exposure.

It will be understood that an object can be enlarged in printing with a desired magnification by merely specifying the magnification of printing enlargement prior t photography.

Figure 16:
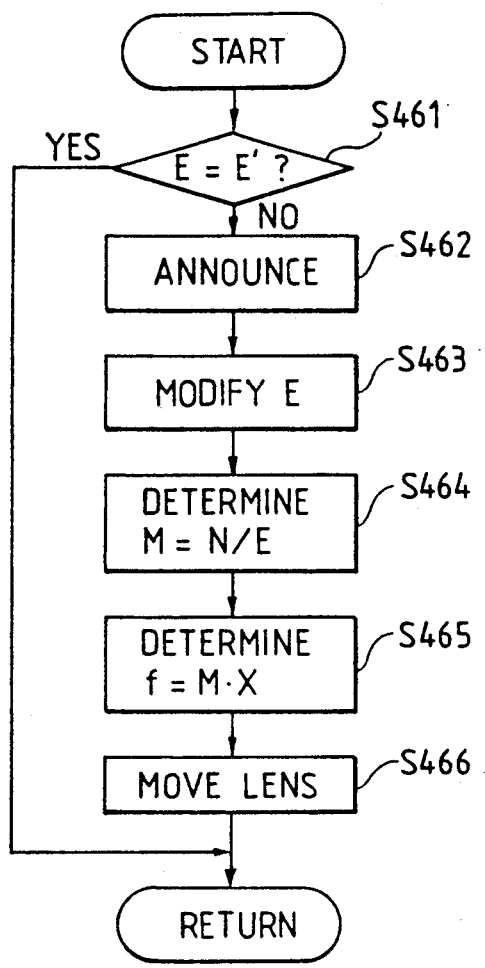
FIG. 16 is a flow chart illustrating details of a correction step in FIG. 15.
Figure 18:
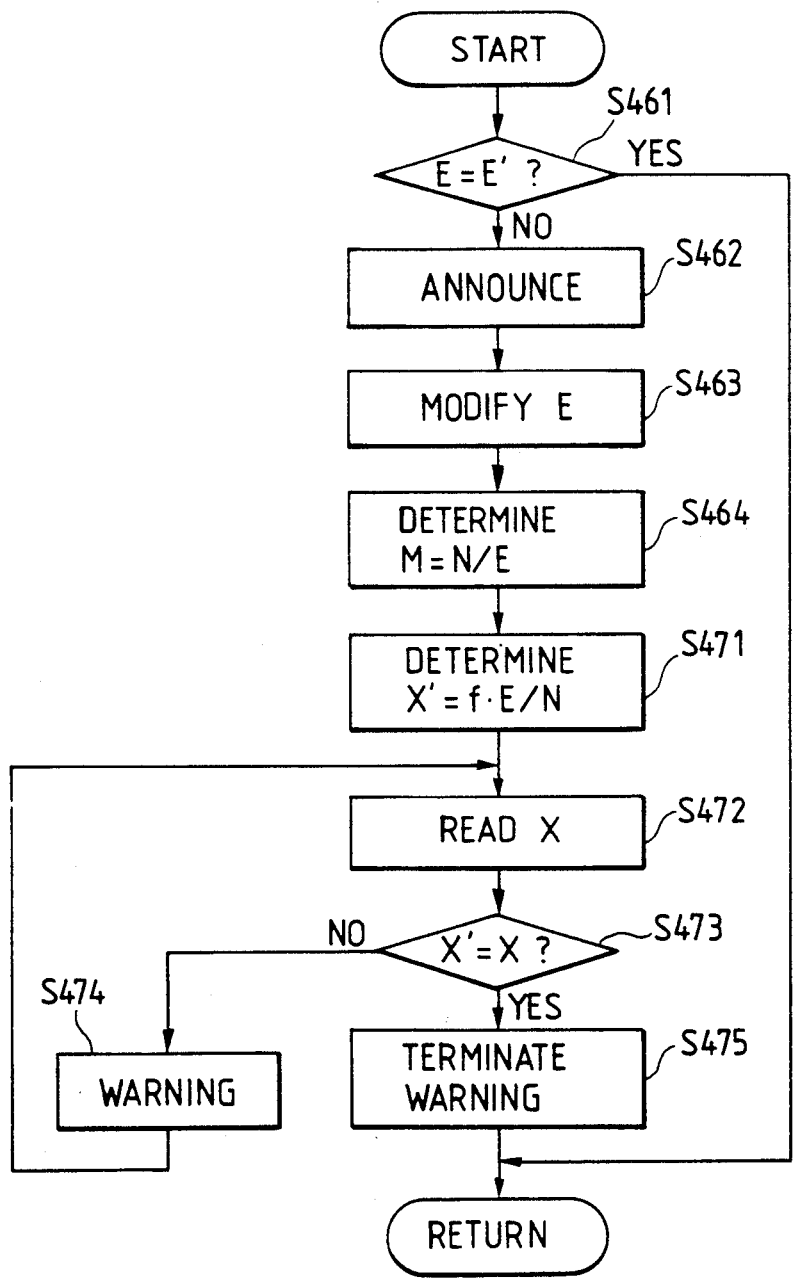
FIGS. 18 to 20 are flow charts illustrating details of respective examples of a correction step.
Figure 19:
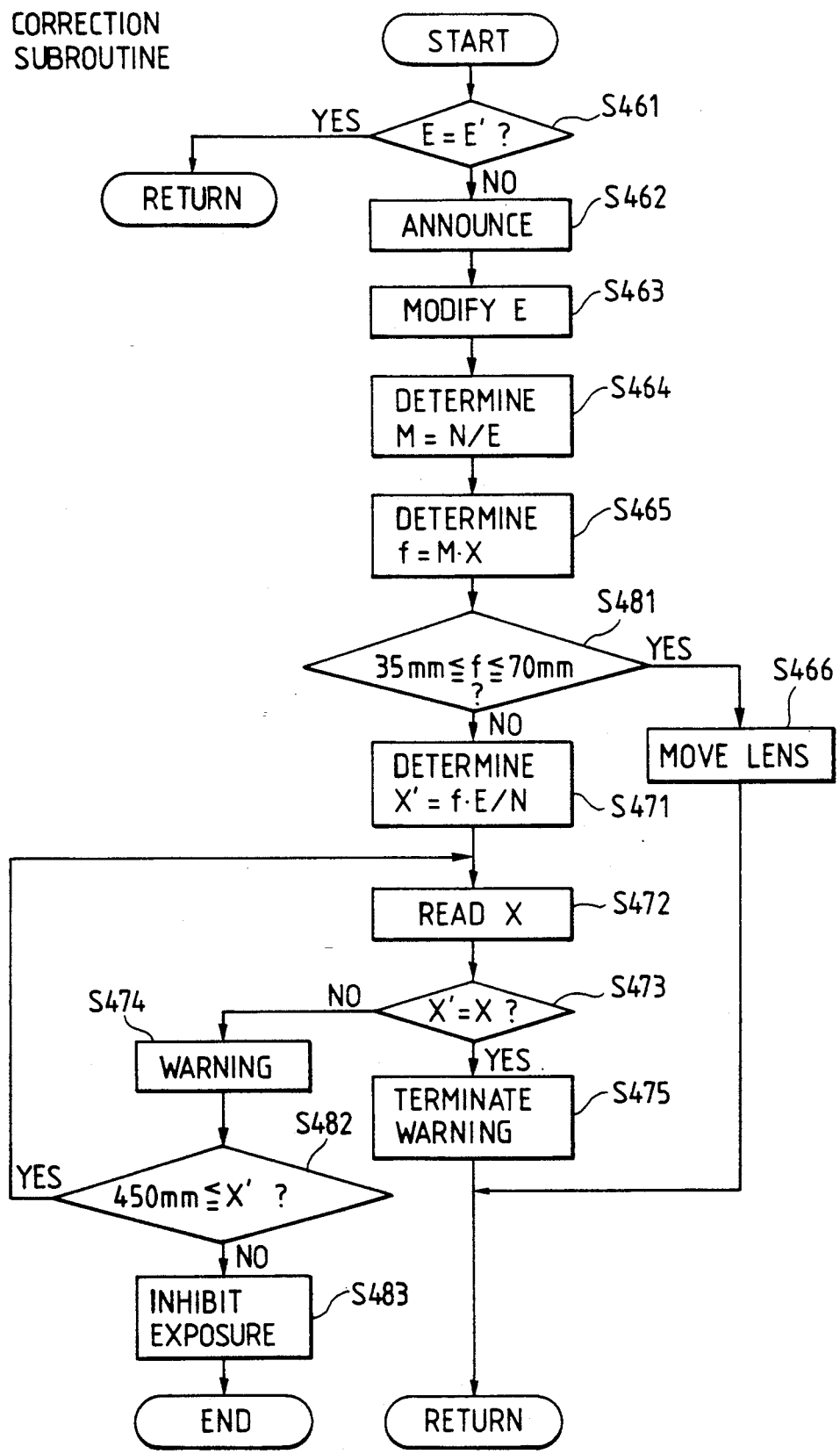
Figure 20:
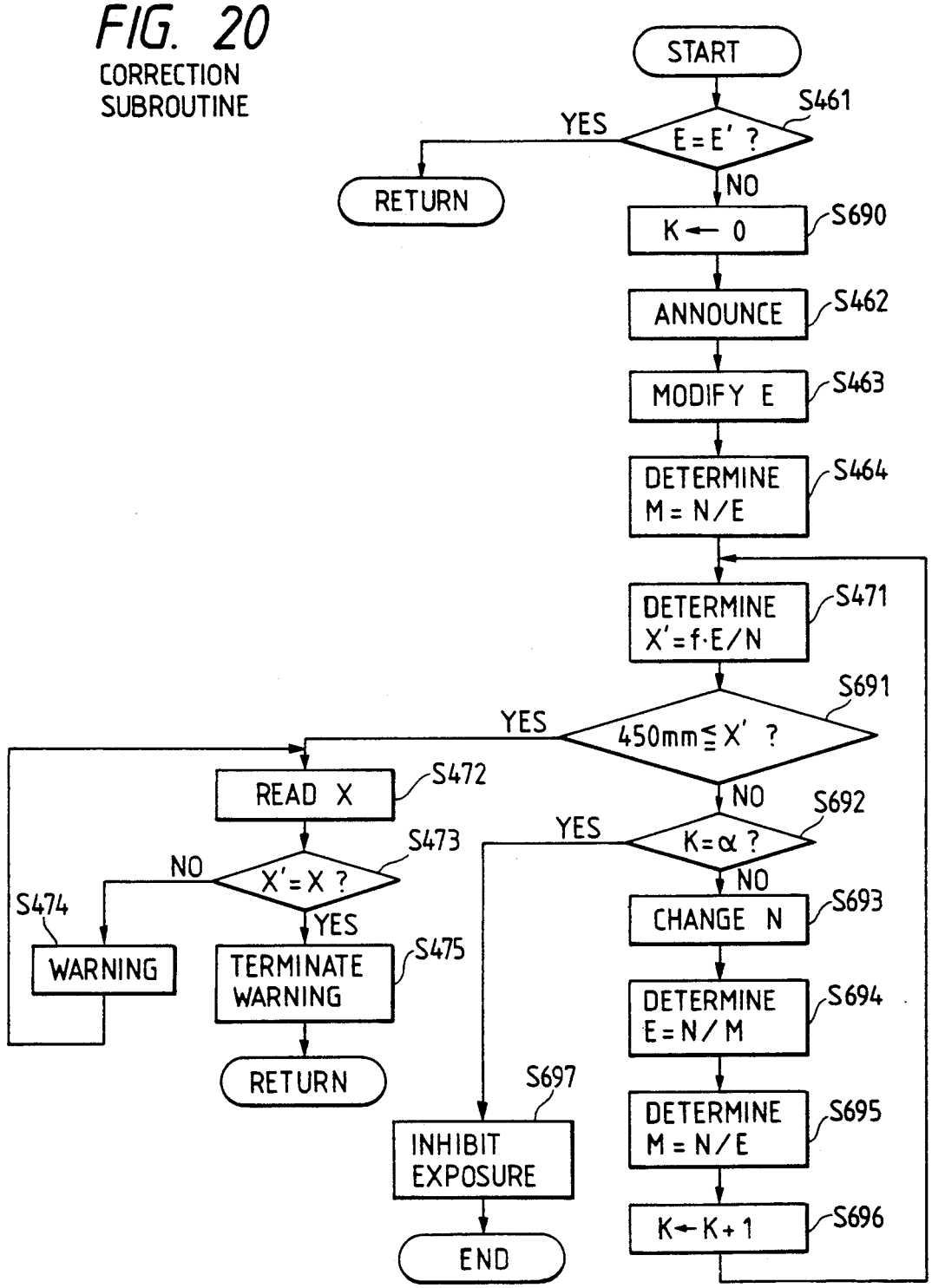

FIGS. 18 to 20 show modifications of the correction subroutine shown in FIG. 16. In these Figures, steps like those in FIG. 16 are designated by like reference symbols.

The subroutine shown in FIG. 18 is executed in a camera using a single focal point lens as photographing lens.

Figure 15:
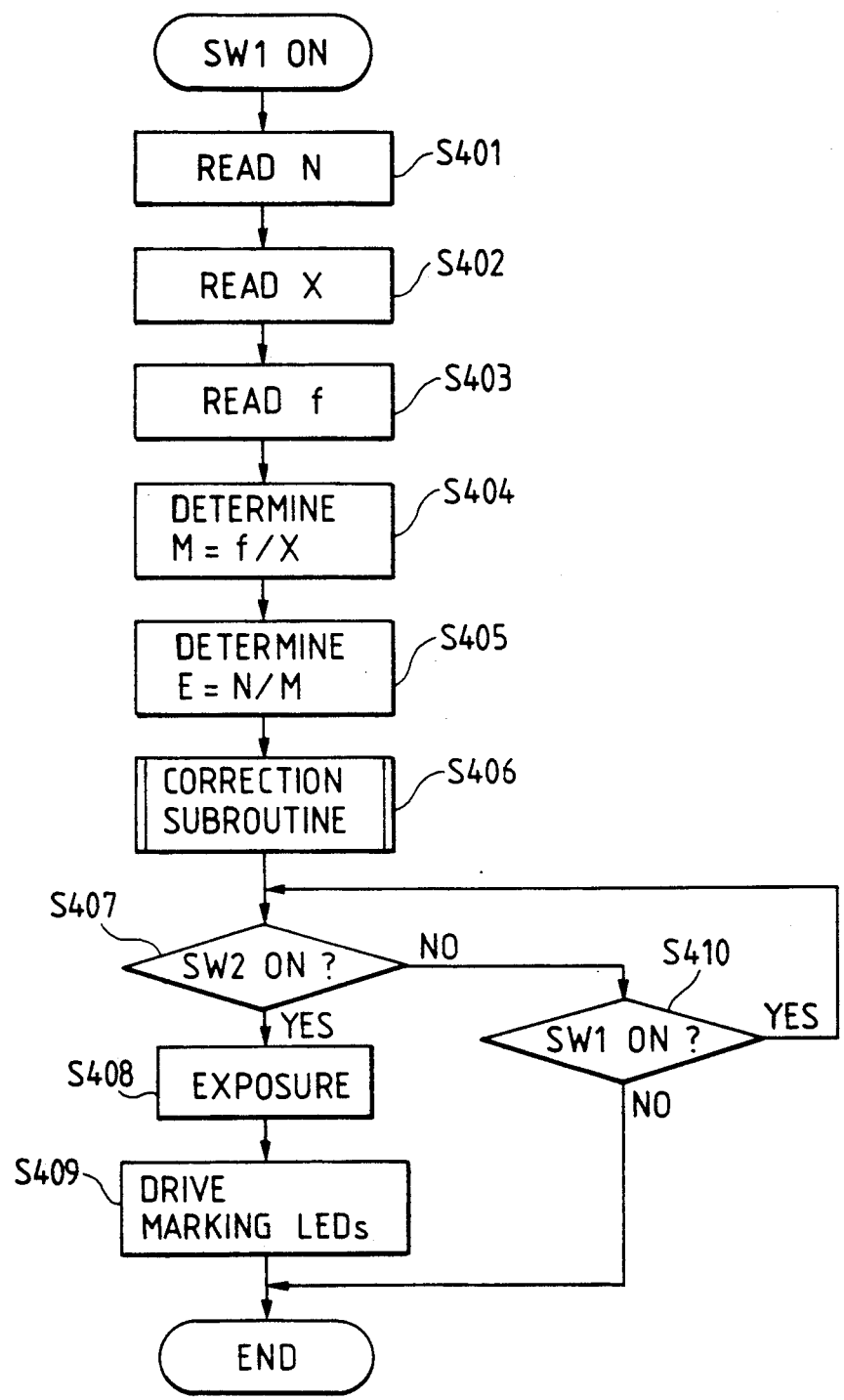
FIG. 15 is a flow chart illustrating a camera routine in the second embodiment.

If it is detected in step S461 after step S401 to S405 in FIG. 15 that the enlargement magnification E is a predetermined value, the routine goes to step S407 in FIG. 15. Otherwise, steps S462 to S464 are executed, and then the object distance x is corrected in step S471. Since in this example the photographing lens is a single focal distance lens, the focal distance can not be modified. Therefore, the object distance x is modified to satisfy the requested magnification N. More specifically, new object distance x' is determined in step S471 from the new enlargement magnification E and requested magnification N by using equations (3) and (4).

In subsequent step S472, the object distance measuring unit 22 is operated to read the object distance x as a result of detection. Then a check is done in step S473 as to whether the object distance x is the same as the object distance x' determined in step S472. If x' x, a warning is produced by turning on the LED 8 in step S474.

Steps S472 to S474 are repeatedly executed until it is detected that x'=x. Subsequently, the routine goes to step S475.

In step S475 the warning is terminated. The routine then goes to step S407 in FIG. 15 to effect photography and marking with of the turning-on the switch SW2 as described above.

If it is found in step S473 that x' x, the photographer changes the photographing position to let the corrected value x' be equal to the actual object distance x. Then, when it is found that x'=x, the photographer can know that a photograph of the desired magnification can be obtained by photography effected at that position.

The subroutine shown in FIG. 19 is executed when the subroutine of FIG. 18 is added to a camera capable of mounting a zoom lens. In step S481 a check is done as to whether the determined focal distance f is in a focal distance range of the zoom lens as photographing lens. For example, if the determined focal distance f is 30 mm when mounting a zoom lens capable of setting a focal distance in a range of 35 to 70 mm, step S481 provides NO, and the routine goes to step S471 for executing steps S471 to S473 (as in FIG. 18). If step S473 provides NO, a warning is produced in step S474, and in subsequent step S482 a check is done as to whether the object distance x' obtained in step S471 permits focusing with the photographing lens. For example, if the object distance x' obtained in step S471 is 420 mm while the minimum photographing distance of the photographing lens (i.e., minimum object distance permitting focusing with the photographing lens) is 450 mm, step S482 provides NO, and in step S483 the exposure is inhibited with release lock or the like, thus bringing an end to the routine. If step S482 provides YES, the routine returns to step S472 to repeat step S472 to S474 and S482.

If step S473 provides YES, the warning is terminated in step S475, and the routine goes to step S407 in FIG. 15. If step S481 provides YES, the focal distance is changed by driving the photographing lens (step S466), and then the routine goes to step S407 in FIG. 15.

The subroutine shown in FIG. 20 is executed when the requested magnification N is changed at the camera if the determined object distance does not permit focusing with the photographing lens. This subroutine is for a single focal distance lens mounted on a camera.

In step S690 a count K monitoring the number of changes in he requested magnification N is initialized. In consequence, if the object distance x' is subsequently determined in step S471 in the manner as described, a check is done in step S691 as to whether the object distance x' is no less than the minimum object distance (for instance 450 mm) permitting focusing with the photographing lens. If this check provides YES, step S472 is executed as in the case of FIG. 18, and then the routine goes to step S407 in FIG. 15.

If step S691 provides NO, a check is done in step S692 as to whether a predetermined number is reached by the count K. If step S692 provides NO, the requested magnification N is changed in step S693. For example, if N is initially 1, it is changed to ½. When N is changed, the CPU 1 causes display of the change on the display unit 13. In subsequent step S694, the enlargement magnification E is determined by substituting the changed requested magnification N and photographing magnification M determined in step S464 into equation (4), and also the closest one of the plurality of predetermined enlargement magnification values E' to the determined enlargement magnification E is set as new enlargement magnification E. In this way, the enlargement magnification E is modified.

Subsequently, a new photographing magnification M is calculated in step S695 from the changed requested magnification N obtained in step S693 and modified enlargement magnification E obtained in step S694, and in step S696 the count K is incremented by "+1". Then the routine returns to step S471.

If step S692 provides YES, that is, when a predetermined number is exceeded by the number of changes in the requested magnification N executed in step S693, the exposure is inhibited with release lock (step S697) to bring an end to the routine.

In the above subroutine, if the changed object distance x' is incapable of permitting focusing. The requested magnification N is changed to modify the enlargement magnification E and photographing magnification N, and the object distance x' is changed again. If the object distance x' is in a range permitting focusing, as obtained by repeating the above sequence, the actual object distance x is set as x'. If it is impossible to draw the object distance x' into the range permitting focusing by changing the requested magnification N any number of times, the release is inhibited to prevent the requested magnification N from being greatly changed from the initial value.

If it is assumed in the case of FIG. 20 that the focal distance f is 35 mm, the object distance x is 45 cm, the initial requested magnification N is 1 and the minimum photographing distance of the photographing lens is 45 cm as in the case of FIG. 16, M=0.078 from equation (3), and E is 12.8 from equation (4). By modifying E to E=12 and substituting the modified E into equation (4), we have M=1/12. Further, by substituting this modified M into equation (3) and fixing the focal distance f (to 35 mm), the object distance x' is 42 cm. This object distance x' is shorter than 45 cm, the minimum photographing distance of the photographing lens, so that it can not permit focusing on the object. Accordingly, the requested magnification N is changed from 1 to ½. By substituting this N=½ and initial M=0.078 into equation (4) E=25.6 is obtained. By modifying this E=25.6 to E=20 and substituting the modified E into equation (2) M=1/40 is obtained. By substituting the modified M into equation (1) x'=1.4 m is obtained. This object distance x' can permit focusing with the photographing lens.

Figure 21:
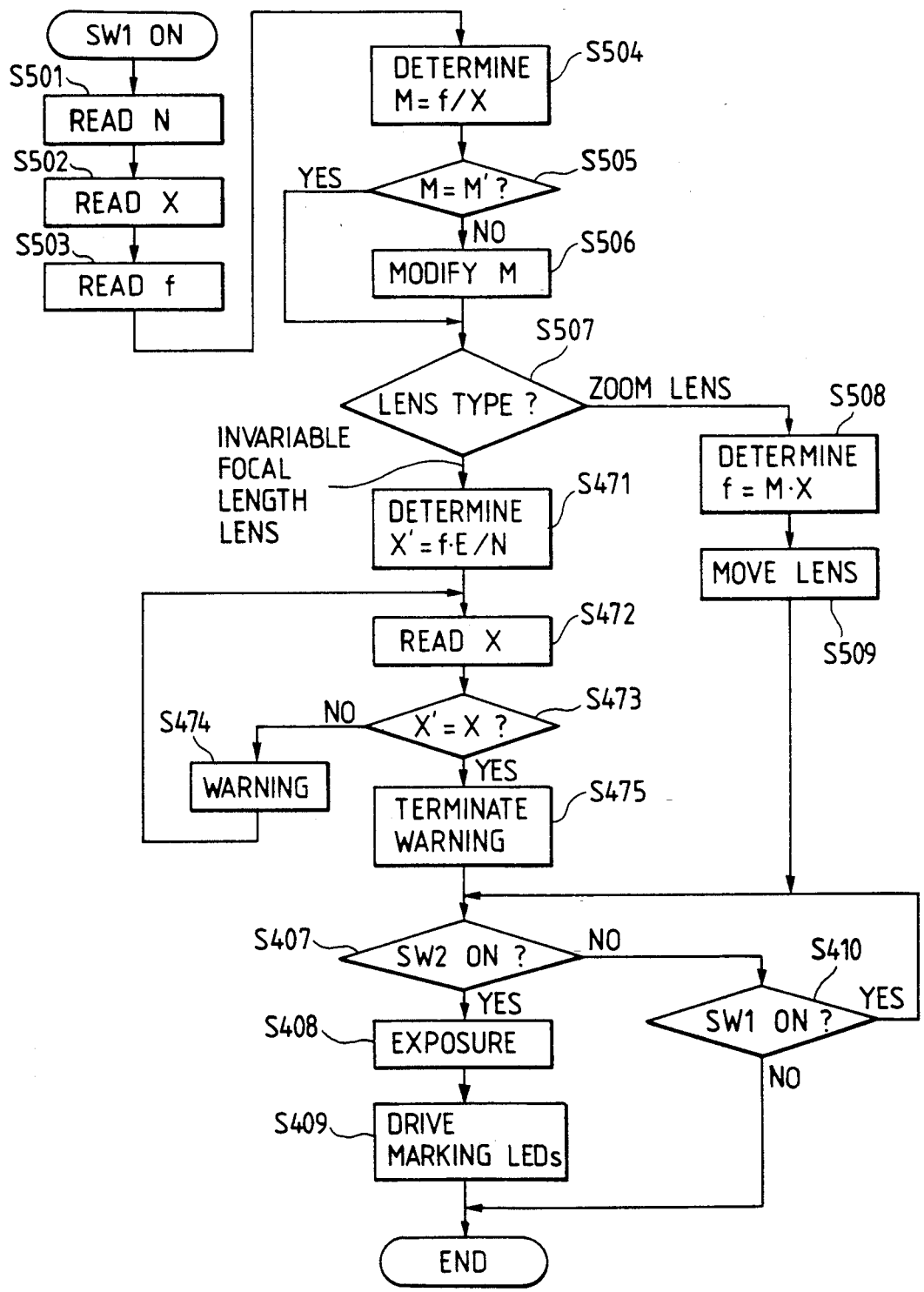
FIG. 21 is a flow chart illustrating a camera routine in a third embodiment of the invention.

A subroutine shown in FIG. 21 is executed with a third embodiment of the invention. In this instance, instead of recording data representing the enlargement magnification E on film at the time of photography, data representing the requested magnification N and photographing magnification M are recorded on film. The structures of the camera and enlarger are the same as those shown in FIG. 13, and hence they are not described any further.

The subroutine shown in FIG. 21 is started by operating the switch SW1 after setting the requested magnification N by operating the switch SW3. First, the requested magnification N, object distance x and focal distance f are read out by the CPU in respective steps S501 to S503.

In subsequent step S504, the photographing magnification M is determined from the read-out object distance x and focal distance f by using equation (3). Then a check is done in step S505 as to whether the photographing magnification M is a predetermined value. In the instant embodiment, data M' of a plurality of photographing magnifications are stored in the CPU 21, and the check in step S505 is done as to whether there is any value among data M' that is identical with the photographing magnification M determined in step S504. If step S505 provides YES, step S507 is executed. Otherwise, step S506 is executed, in which the photographing magnification M is modified to the closest one thereto among the predetermined value data M', and then the routine goes to step S507.

In step S507, a check is done as to whether the lens mounted in the camera is a single focal distance lens or a zoom lens. In the case of a single focal distance lens, the same routine as steps S471 to S475 in FIG. 18 is executed. When the object distance x' is identical with the actual object distance, a check is done in step S407 as to whether the full depression switch SW2 is "on". If step S407 provides YES, exposure is effected in step S408, and the photographing magnification M and requested magnification N are marked on a marginal portion of film, thus bringing an end to the routine.

If it is detected in step S507 that a zoom lens is mounted, the focal distance f of the photographing lens is determined again in step S508. Here, the focal distance f is determined from the photographing magnification M modified in step S506 (or value determined in step S504) and read-out object distance x by using equation (3), and the photographing lens is moved to match the focal distance f thus determined. The routine then goes to step S407.

In the above procedure, data representing the photographing magnification M and requested magnification M are marked on film. Thus, when printing this frame of film, the enlargement magnification is determined at the enlarger. More specifically, data of the requested magnification N and photographing magnification M are read out by the information reader 42 and recognized by the CPU 41. The CPU 41 determines the enlargement magnification E by substituting the recognized values into equation (4) and then moves the enlarging lens according to the enlargement magnification E for exposure, as shown in steps S451 and S452 in FIG. 17. In this way, a print can be obtained, in which the object is enlarged to a desired magnification.

While the above description is concerned with the marking of data representing the requested magnification N and photographing magnification M, it is also possible to permit data representing the requested magnification N object distance x and focal distance f to be marked on film. In this case, it is necessary to modify the object distance x and focal distance f to values capable of being marked as noted before.

FIGS. 22A to 22D illustrate a further embodiment.

In these instances, one of two different enlargement magnifications is selected. More specifically, as print size, in which a print can be produced by the enlarger, there are provided only two different standard sizes (here L and 2 L sizes), and on the camera it is possible to specify only two different enlargement magnifications E corresponding to the respective standard sizes. Initially, a value corresponding to L size is set as enlargement magnification E in the camera.

Figure 22B:
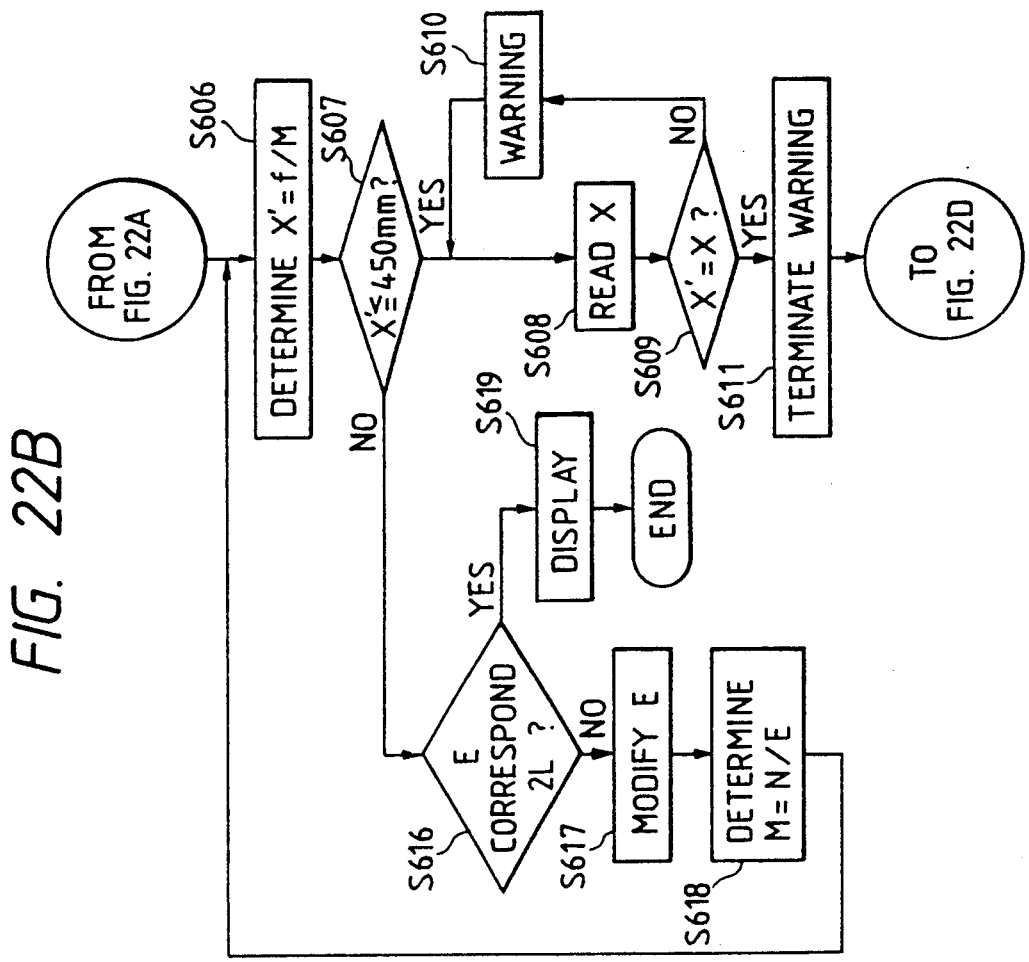
Figure 22A:
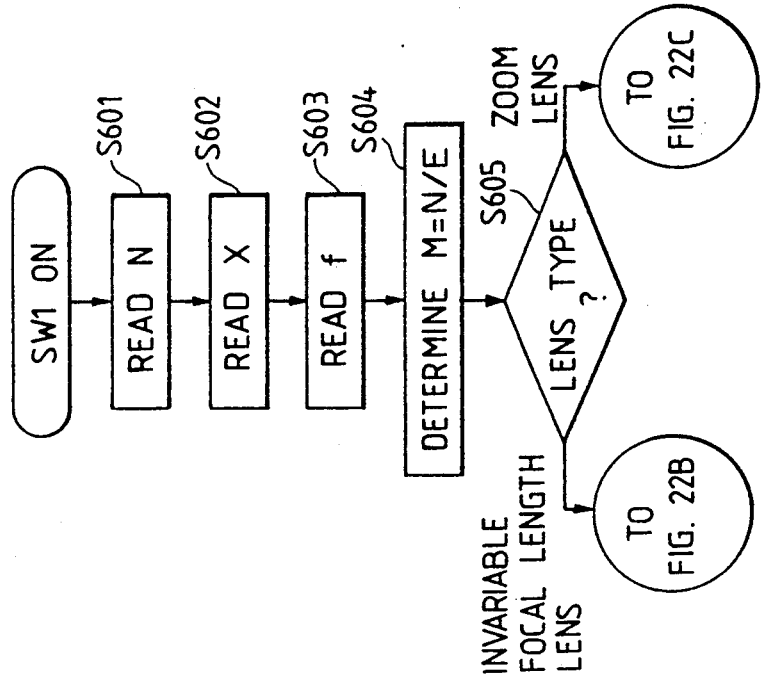
Figure 22D:
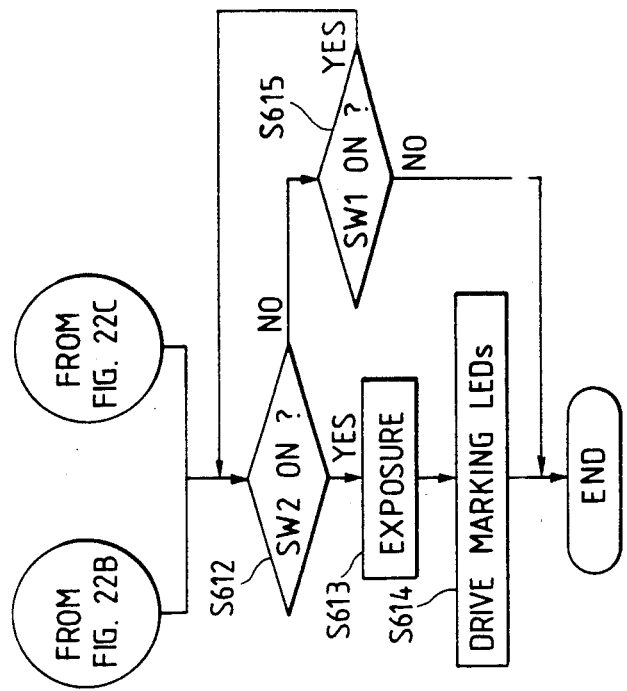

The routine shown in FIG. 22A is standard when the switch SW1 is turned on after the requested magnification N is specified when setting the magnification specification mode as in the previous embodiments. First, the requested magnification N, object distance x and focal distance f are read out in respective steps S601 to S603.

Then the photographing magnification M is determined in step S604 from the requested magnification N and initially specified enlargement magnification E (corresponding to L size) using equation (4), and if necessary, M is modified. More specifically, in this embodiment a check is done as to whether there is any predetermined value among a plurality of predetermined photographing magnifications M' that is identical with the determined photographing magnification M, as in FIG. 21. If there is such predetermined value, step S605 is executed. Otherwise, the photographing magnification M is changed to the closest one of the provided values, and then the routine goes to step S605.

In subsequent step S605 a check is done as to whether the mounted lens is a single focal distance lens or a zoom lens. If the lens is a single focal point lens, the routine goes to step S606 in FIG. 22B. In step S606, the object distance x' is determined, and in step S607 a check is done as to whether the object distance x' is in a range capable of focusing, for instance no less than 450 mm. If step S607 provides NO, step S616 is executed, in which a check is done as to whether the presently set enlargement magnification E corresponds to 2 L size.

If step S616 provides NO, the enlargement magnification E is modified to that corresponding to 2 L size, while also this is announced on the display unit 23 (step S617). In subsequent step S618 the photographing magnification M is determined again from the modified magnification E and requested magnification N using equation (4). The routine then returns to step S606 to repeat the sequence described so far. If step S616 provides YES, a decision is made that the desired requested magnification N can not be obtained with any of the print sizes, and it is announced in step S619, thus bringing an end to the routine.

If step S607 provides YES, the object distance x is read out again in step S608, and then a check is done in step S609 as to whether this focal distance x is equal to the object distance x' determined in step S608. If the check provides NO, a warning is produced in step S610, and then the routine returns to step S608. Steps S608 and S609 are repeated until YES is given to x'=x. When x'=x, the warning is terminated in step S611, and the routine goes to step S612 in FIG. 22D.

In step S612, a check is done as to whether the full depression switch SW2 is "on". If the check provides NO, a check is done in step S615 as to whether the switch SW1 is "on". If step S615 provides YES, the routine returns to step S612, and otherwise an end is brought to the routine. If step S612 provides YES, exposure is effected in step S613, and marking is done by the marking unit 29 in step S614. Here, the finally determined requested magnification N (corresponding to either L or 2 L size) and photographing magnification M are marked on film.

Figure 22C:
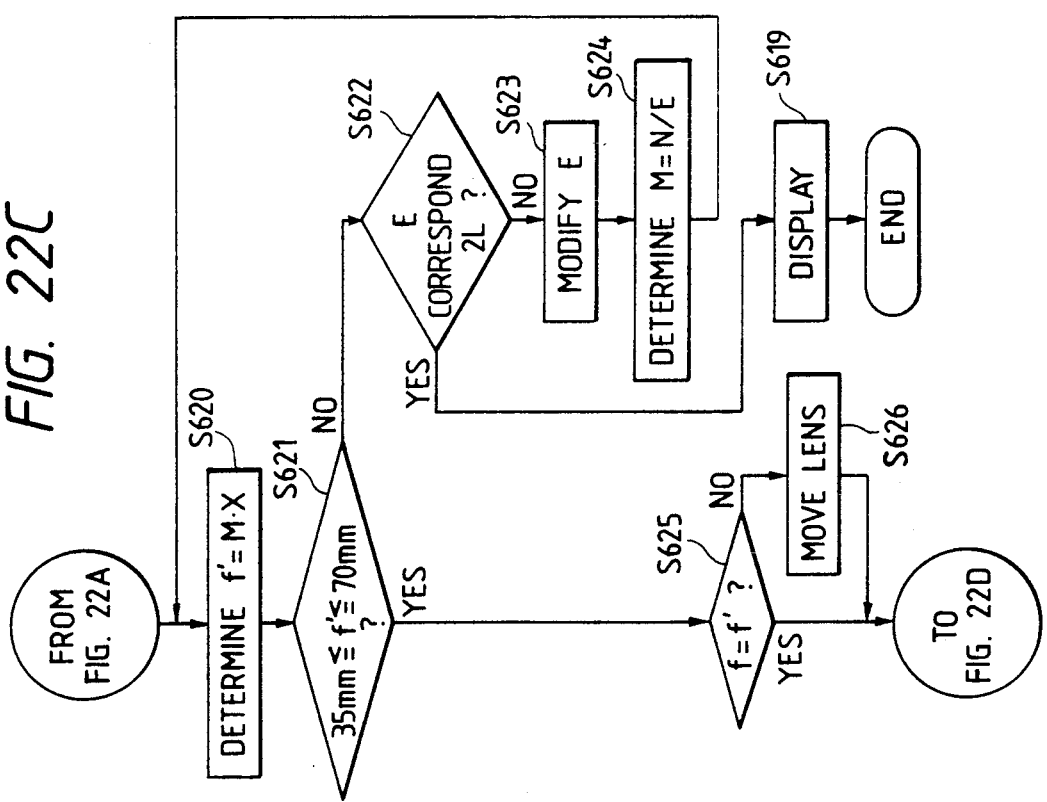
Figure 23B:
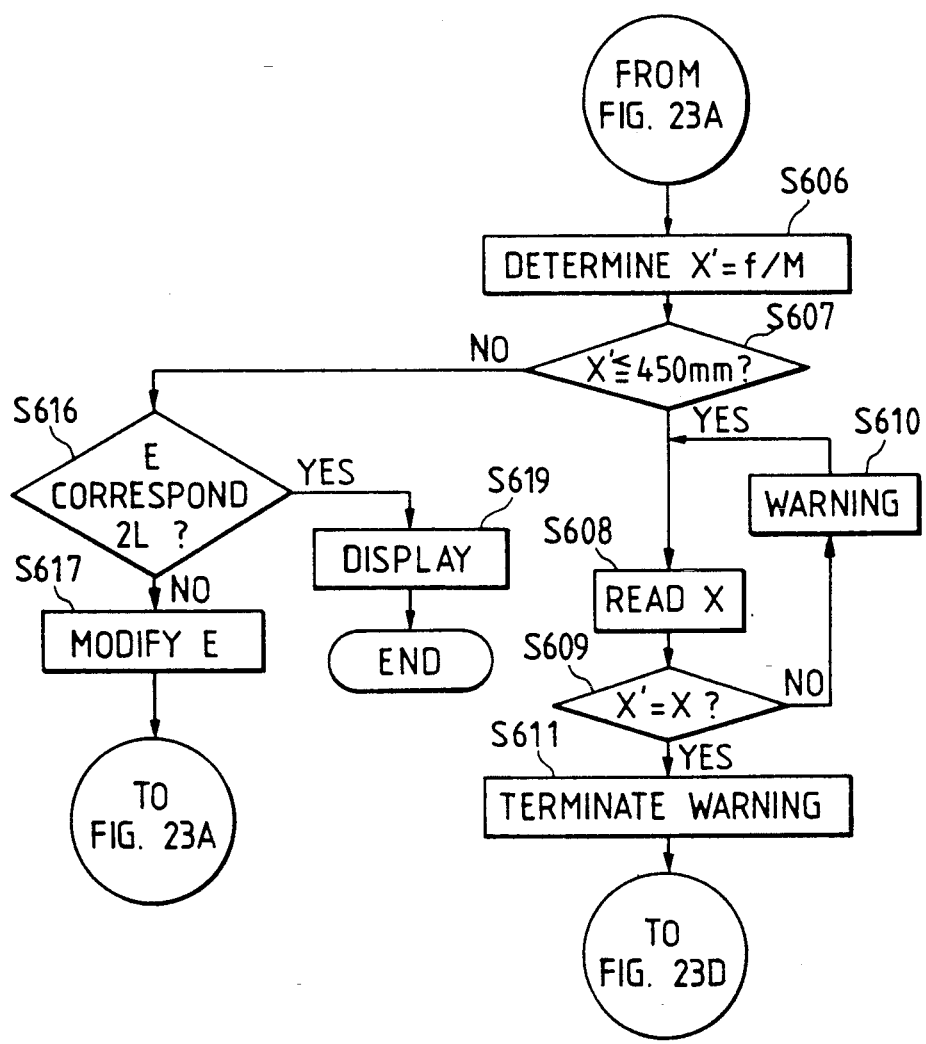
Figure 23D:
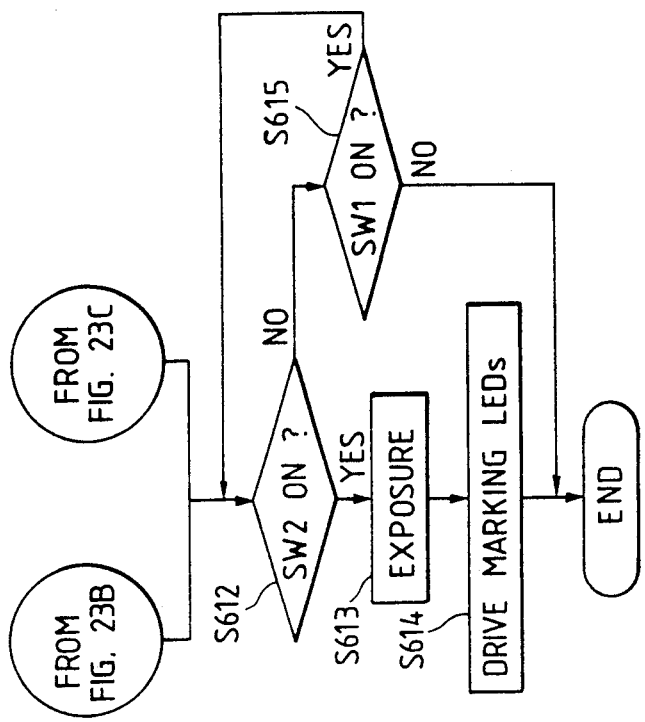
Figure 23C:
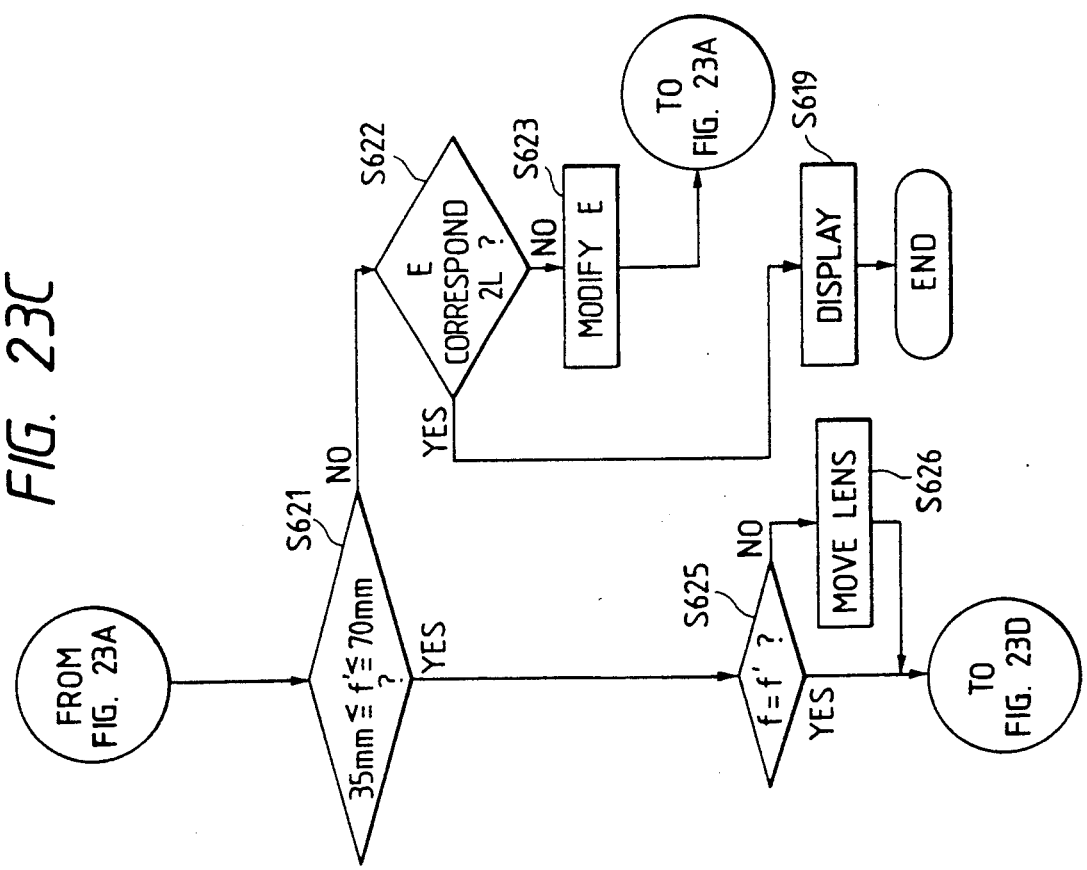

If it is detected in step S605 in FIG. 22A that a zoom lens is mounted, the routine goes to step S620 in FIG. 22C to determine the focal point f' of lens from the read-out object distance x and photographing magnification M. In subsequent step S621 a check is done as to whether the focal distance f' is in a zooming range of the photographing lens, for instance in a range of 35 to 70 mm. If the check provides NO, the routine goes to step S622.

In step S622 a check is done as to whether the prevailing enlargement magnification E corresponds to 2 L size. If the check provides YES, a decision is made that the desired requested magnification N can not be obtained with any of the print sizes, and it is announced on the display unit 33 in step S619. If step S622 provides NO, the enlargement magnification E is changed to one corresponding to 2 L size, while this is announced on the display unit 33 (step S623). Then in step S624 the photographing magnification M is determined again using equation (4), and then the routine returns to step S620 to repeat the sequence described so far.

If step S621 provides YES, a check is done in step S625 as to whether the focal distance f' is equal to the read-out focal distance f. If step S625 provides YES, step S612 is executed. Otherwise, the photographing lens is moved for zooming to match the focal distance f', and then the routine goes to step S612 in FIG. 22D.

In the above embodiment, the enlargement magnification E is selectable as one of two different values corresponding to L and 2 L sizes, respectively. When a desired requested magnification N can be obtained with either enlargement magnification E, this magnification E is marked. If desired requested magnification N can not be obtained with any of the enlargement magnifications E, exposure is inhibited.

The marking of the photographing magnification M in step S614 is done not for controlling the enlarger but for displaying the photographing magnification on a print obtainable by the enlarger.

FIGS. 23A to 23D illustrate a further embodiment in a camera with a zoom lens mounted thereon. Like the above embodiment, the enlargement magnification E is limited to those corresponding to L and 2 L sizes, and data representing the enlargement magnification E and focal distance f of the zoom lens are marked. In FIGS. 23A to 23D, steps like those in FIGS. 22A to 22D are designated by like symbols.

The routine is started when the switch SW1 is turned on. First, the requested magnification N and object distance x are read out in respective steps S601 and S602. In step S701 the print size is read out. In the camera of this embodiment the print size can be specified as either one of two different sizes corresponding to respective L and 2 L sizes by operating a setting member (not shown).

In subsequent step S702 the photographing magnification M is determined from the read-out enlargement magnification E corresponding to either print size and requested magnification N using equation (4). Then in step S703 the focal distance f of the zoom lens is determined from the determined photographing magnification M and read-out object distance x. In subsequent step S704 a check is done as to whether the focal distance f is a predetermined value. In this embodiment, a plurality of predetermined values fp concerning the focal distance are stored in the CPU for the purpose of providing data of the focal distance f, and the check in step S704 is done as to whether any of the predetermined values fp is identical with the focal distance f determined in step S704. If step S704 provides YES, step S605 is executed. Otherwise, the focal distance f is modified in step S705 to the closest one of the predetermined values fp, and then the routine goes to step S605. The subsequent part of routine is the same as in the case of FIGS. 22B to 22D except for that the routine returns from step S617 or S623 to step S702.

After exposure in step S613, data of the enlargement magnification E corresponding to either print size and focal distance at the time of exposure are marked by the marking unit 29 in step S614.

In each of the above embodiments, it is possible to drive the marking LEDs either before or after the shutter release.

Further, enlargement data may be recorded on a magnetic recording medium (of card type, for instance) which is provided separately from film. Further, it is possible to effect marking by forming holes in film or coating a paint thereon.

Furthermore, while in the above embodiments data of E, N, x and f are marked on a marginal portion of film at the time of photography, these data may not be marked but may be merely displayed on, for instance, a liquid crystal display. Where the enlargement magnification E is displayed, the photographer may specify the displayed magnification E to the enlarger, whereby printing will be made according to the specified enlargement magnification E. Also, where data N, x and f are displayed, these data may be specified to the enlarger.

Moreover, while the foregoing description is concerned with an ordinarily still camera using a silver salt film and associated enlarger, this is by no means limiting. For example, the invention is applicable as well to an electronic still camera, in which photographing data obtained by photography is stored in a floppy disk, or a printer for providing the stored photographing data as hard copy or a display for visualizing the data on a CRT screen or the like. Where a floppy disk is used as photographing data recording medium, output data may be recorded on the floppy disk, and may be detected at the display to obtain a predetermined display.

We claim:

1. A camera capable of producing information on the basis of which a printer produces a print that reproduces an object image recorded on a recording medium, comprising:

means for forming said object image on said recording medium;

means for producing first size information concerning the size of a specific area on said object image formed by said forming means;

size specification means for producing second size information concerning the size of an area on said print that reproduces said specific area on said object image; and means for recording said first size information and said second size information on said recording medium.

2. A camera according to claim 1, wherein said first size information producing means includes means for selecting a changeable specific area of said object and produces said first size information in response to said selecting means.

3. A camera according to claim 2, wherein said first size information producing means further includes a viewfinder and a variable index for indicating said specific area in the field of view of said viewfinder, and produces said first size information in response to the operation of said variable index.

4. A camera according to claim 3, wherein said variable index defies and indicates said specific area in the field of view of said viewfinder.

5. A camera according to claim 1, wherein said size specification means includes operation means for manually inputting said second size information.

6. A camera capable of producing information on the basis of which a printer produces a print that reproduces an object image recorded on a recording medium, comprising:

means for forming said object image on said recording medium;

means for producing first size information concerning the size of a specific area on said object image formed by said forming means;

size specification means for producing second size information concerning the size of an area on said print that reproduces said specific area on said object image;

means for producing, from said first size information and said second size information, magnification data representing an enlargement magnification to be provided to said printer; and means for recording said magnification data on said recording medium.

7. A camera according to claim 6, wherein said first size information producing means includes means for selecting a changeable specific area of said object and produces said first size information in response to said selecting means.

8. A camera according to claim 7, wherein said first size information producing means further includes a viewfinder and a variable index for indicating said specific area int he field of view of said viewfinder, and produces said first size information in response to the operation of said variable index.

9. A camera according to claim 6, wherein said object image forming means includes a photographing lens operable for focusing on said object, and said camera further comprises means for producing modification data corresponding to a change in photographing angle accompanying focusing of said photographing lens.

10. A camera according to claim 6, wherein said object image forming means includes a photographing lens operable for focusing on said object, and said camera further comprises means for modifying said magnification data according to a change in photographing angle accompanying focusing of said photographing lens.

11. A camera capable of producing information on the basis of which a printer produces a print that reproduces an object image recorded on a recording medium, comprising:

means for producing magnification data representing an enlargement magnification to be provided to said printer;

a photographing lens operable for focusing on said object and provided for forming said object image on said recording medium;

means for modifying said magnification data according to a change in photographing angle accompanying focusing of said photographing lens; and means for recording said magnification data modified by said modifying means on said recording medium.

12. A camera capable of producing information on the basis of which a printer produces a print that reproduces an object image recorded on a recording medium, comprising:

a photographing lens operable for focusing on said object and provided for forming said object image on said recording medium;

means for producing first size information concerning the size of a specific area on said object image formed by said photographing lens;

size specification means for producing second size information concerning the size of an area on said print that reproduces said specific area on said object image;

means for producing modification data corresponding to a change in photographing angle accompanying focusing of said photographing lens; and means for recording said first size information, said second size information and said modification data on said recording medium.

13. A camera capable of producing information on the basis of which a printer produces a print that reproduces an object image recorded on a recording medium, comprising:

a photographing lens for forming said object image on said recording medium;

means for providing data concerning the focal length of said photographing lens;

means for providing data concerning the distance from said photographing lens to said object;

means for specifying a requested magnification representing an enlargement ratio of the size of said object image reproduced on said print by said printer relative to the actual size of said object;

means for determining an enlargement magnification to be provided to said printer on the basis of said requested magnification and a photographing magnification determined from said focal length data and said object distance data; and means for recording data representing said enlargement magnification on said recording medium.

14. A camera according to claim 13, wherein said enlargement magnification determining means includes means for selecting said enlargement magnification from a plurality of preset enlargement magnifications on the basis of a value calculated from said requested magnification ad said photographing magnification.

15. A camera according to claim 14 further comprising means for modifying said photographing magnification on the basis of said selected enlargement magnification and said requested magnification.

16. A camera according to claim 15, wherein said modifying means modifies the focal length of said photographing lens.

17. A camera according to claim 14 further comprising means for calculating an object distance on the basis of said selected enlargement magnification, said requested magnification and the focal length of said photographing lens.

18. A camera capable of producing information on the basis of which a printer produces a print that reproduces an object image recorded on a recording medium, comprising:

a photographing lens for forming said object image on said recording medium;

means for providing data concerning the focal length of said photographing lens;

means for providing data concerning the distance from said photographing lens to said object;

means for specifying a requested magnification representing an enlargement ratio of the size of said object image reproduced on said print by said printer relative to the actual size of said object; and means for recording said focal length data, said object distance data and said requested magnification on said recording medium.

19. A camera capable of producing information on the basis of which a printer produces a print that reproduces an object image recorded on a recording medium, comprising:
- a photographing lens for forming said object image on said recording medium;
- means for providing data concerning the focal length of said photographing lens;
- means for providing data concerning the distance from said photographing lens to said object;
- means for producing data concerning a photographing magnification from said focal length data and said object distance data;
- means for specifying a requested magnification representing an enlargement ratio of the size of said object image reproduced on said print by said printer relative to the actual size of said object; and
- means for recording said photographing magnification and said requested magnification on said recording medium.

20. A camera capable of producing information on the basis of which a printer produces a print that reproduces an object image recorded on a recording medium, comprising:
- a photographing lens for forming said object image on said recording medium;
- means for providing data concerning the focal length of said photographing lens;
- means for providing data concerning the distance from said photographing lens to said object;
- means for specifying a requested magnification representing an enlargement ratio of the size of said object image reproduced on said print by said printer relative to the actual size of said object;
- means for determining an enlargement magnification to be provided to said printer on the basis of said requested magnification and a photographing magnification determined from said focal length data and said object distance data; and
- means for displaying said enlargement magnification.

21. A camera according to claim 20, wherein said enlargement magnification determining means includes means for selecting said enlargement magnification from a plurality of preset enlargement magnifications on the basis of a value calculated from said requested magnification and said photographing magnification.

22. A camera according to claim 21 further comprising means for modifying said photographing magnification on the basis of the selected enlargement magnification and said requested magnification.

23. A camera according to claim 22, wherein said modifying means modifies said focal length of said photographing lens.

24. A camera according to claim 21 further comprising means for calculating an object distance on the basis of the selected enlargement magnification, said requested magnification and said focal length of said photographing lens.

25. A camera capable of producing information on the basis of which a printer produces a print that reproduces an object image recorded on a recording medium, comprising:
- a photographing lens for forming said object image on said recording medium;
- means for providing data concerning the focal length of said photographing lens;
- means for providing data concerning the distance from said photographing lens to said object;
- means for specifying a requested magnification representing an enlargement ratio of the size of said object image reproduced on said print by said printer relative to the actual size of said object; and
- means for displaying said focal length data, said object distance data and said requested magnification.

26. A camera capable of producing information on the basis of which a printer produces a print that reproduces an object image recorded on a recording medium, comprising:
- a photographing lens for forming said object image on said recording medium;
- means for providing data concerning the focal length of said photographing lens;
- means for providing data concerning the distance from said photographing lens to said object;
- means for producing data concerning a photographing magnification from said focal length data and said object distance data;
- means for specifying a requested magnification representing an enlargement ratio of the size of said object image reproduced on said print by said printer relative to the actual size of said object; and
- means for displaying said photographing magnification and said requested magnification.

27. A camera capable of producing information on the basis of which a printer produces a print that reproduces an object image recorded on a recording medium, comprising:
- means for selecting an enlargement magnification to b provided to said printer from a plurality of enlargement magnifications corresponding to a plurality of prints of different sizes;
- a photographing lens for forming said object image on said recording medium;
- means for specifying a requested magnification representing an enlargement ratio of the size of said object image reproduced on said print by said printer relative to the actual size of said object;
- evaluation means for calculating a photographing magnification from said requested magnification and said selected enlargement magnification and evaluating the calculated photographing magnification;
- means for modifying, in response to said evaluation means, the selected enlargement magnification into another enlargement magnification of said plurality of enlargement magnifications; and
- means for recording the modified enlargement magnification on said recording medium.

28. A camera according to claim 27, wherein said evaluation means includes means for calculating an object distance from said photographing magnification and a focal length of said photographing lens, and means for determining the appropriateness of said object distance.

29. A camera according to claim 27, wherein said evaluation means includes means for providing data concerning the distance from said photographing lens to said object, means for calculating a focal length of said photographing lens from said photographing magnification and the distance from the photographing lens to said object and means for determining the appropriateness of said focal length.

30. A camera capable of producing information on the basis of which a printer produces a print that reproduces an object image recorded on a recording medium, comprising:
- means for selecting an enlargement magnification to be provided to said printer from a plurality of enlargement magnifications corresponding to a plurality of prints of different sizes;

a photographing lens for forming said object image on said recording medium;

means for specifying a requested magnification representing an enlargement ratio of the size of said object image reproduced on said print by said printer relative to the actual size of said object;

evaluation means for calculating a photographing magnification from said requested magnification and the selected enlargement magnification and evaluating the calculated photographing magnification;

means for modifying, in response to said evaluation means, said selected enlargement magnification into another enlargement magnification of said plurality of enlargement magnifications;

means for determining a photographing magnification on the basis of the modified enlargement magnification and said requested magnification; and means for recording said requested magnification and the determined photographing magnification on said recording medium.

31. In an operating method of a camera to cause a printer to provide a print of a given magnification from an image recorded on a recording medium, the improvement comprising:

reading an object's magnification, reading a distance for a field to be photographed;

reading a focal distance of a photographing optical system;

calculating a photographing magnification;

calculating a printing enlargement magnification;

performing a comparison between said calculated printing enlargement magnification and a printing magnification of the printer and producing a warning output when said calculated printing enlargement magnification does not correspond to the printing magnification of the printer;

further calculating another photographing magnification in response to said warning output so that said calculated printing enlargement magnification corresponds to the printing magnification of the printer; and changing the focal distance of the photographing optical system to a distance corresponding to said another photographing magnification.

32. In an operating method of a camera to cause a printer to provide a print of a given magnification from an image recorded on a recording medium, the improvement comprising:

reading an object's magnification;

reading an object distance;

reading a focal distance of a photographing optical system;

calculating a photographing magnification;

calculating a printing enlargement magnification;

performing a comparison between said calculated printing enlargement magnification and a printing magnification of the printer and producing a warning output when said calculated printing enlargement magnification does not correspond to the printing information of the printer;

further calculating another photographing magnification in response to said warning output so that said calculated printing enlargement magnification corresponds to the printing magnification of the printer; and changing the object distance to a distance corresponding to said another photographing magnification.

33. In an operating method of a camera to cause a printer to provide a print of a given magnification from an image recorded on a recording medium, the improvement comprising:

reading an object's magnification;

reading an object distance;

reading a focal distance of a photographing optical system;

calculating a photographing magnification;

calculating a printing enlargement magnification;

performing a comparison between said calculated printing enlargement magnification and a printing magnification of the printer and producing a warning output when said calculated printing enlargement magnification does not correspond to the printing magnification of the printer;

further calculating another photographing magnification in response to said warning output so that said calculated printing enlargement magnification corresponds to the printing magnification of the printer; and changing the object's magnification and the object distance to change the photographing magnification to said another photographing magnification.

34. A camera which produces printing information to provide a print from an image recorded on a medium, comprising:

a photographing optical system;

an outputting part to output first information relating to a focal distance of said photographing optical system;

an outputting part to output second information relating to an object distance;

a producing part to output third information relating to a photographing magnification on the basis of said first and said second information; and a recording part to record said first, said second and said third information on said medium.

* * * * *